United States Patent [19]
Gabriel et al.

[11] Patent Number: 5,922,663
[45] Date of Patent: Jul. 13, 1999

[54] ENHANCEMENT OF SOIL RELEASE WITH GEMINI SURFACTANTS

[75] Inventors: Robert Gabriel; Gladys Saliba Gabriel, both of Cranbury; Mark David Einziger, Manalapan, all of N.J.

[73] Assignee: Rhodia Inc., Cranbury, N.J.

[21] Appl. No.: 08/726,437

[22] Filed: Oct. 4, 1996

[51] Int. Cl.$^6$ ............................ C11D 1/70; C11D 1/83; C11D 1/835; B01F 11/42
[52] U.S. Cl. .................. 510/299; 510/517; 510/528; 516/76; 516/920
[58] Field of Search ................. 252/312, 351, 252/357; 510/517, 528, 299; 516/76, 920

[56] References Cited

U.S. PATENT DOCUMENTS

| | | | |
|---|---|---|---|
| 2,228,988 | 1/1941 | DeGroote et al. | 252/357 X |
| 2,374,354 | 4/1945 | Kaplan | 548/314.4 |
| 2,454,541 | 11/1948 | Bock et al. | 252/351 X |
| 2,524,218 | 10/1950 | Bersworth | 252/117 |
| 2,530,147 | 11/1950 | Bersworth | 260/404.5 |
| 2,532,391 | 12/1950 | Bersworth | 260/404.5 |
| 2,574,537 | 11/1951 | DeGroote et al. | 548/313.7 |
| 2,819,996 | 1/1958 | Riley | 252/312 X |
| 2,846,440 | 8/1958 | Hughes | 548/313.7 X |
| 3,152,080 | 10/1964 | Stuart et al. | 508/285 |
| 3,244,724 | 4/1966 | Guttmann | 510/329 X |
| 3,416,952 | 12/1968 | McIntyre et al. | 117/118 |
| 3,712,873 | 1/1973 | Zenk | 252/8.62 |
| 3,779,934 | 12/1973 | Altenschopfer et al. | 252/351 X |
| 3,893,929 | 7/1975 | Basadur | 252/8.6 |
| 3,959,230 | 5/1976 | Hays | 510/517 X |
| 3,962,152 | 6/1976 | Nicol et al. | 252/551 |
| 4,018,569 | 4/1977 | Chang | 428/678 |
| 4,057,503 | 11/1977 | Graver et al. | 510/517 |
| 4,116,885 | 9/1978 | Derstadt et al. | 252/532 |
| 4,127,489 | 11/1978 | Pracht et al. | 252/8.8 |
| 4,132,680 | 1/1979 | Nicol | 252/547 |
| 4,201,824 | 5/1980 | Violland et al. | 428/262 |
| 4,267,350 | 5/1981 | Tomalia et al. | 548/354 |
| 4,349,688 | 9/1982 | Sandler | 560/91 |
| 4,423,557 | 1/1984 | Westelaken | 34/56 |
| 4,443,362 | 4/1984 | Guth et al. | 252/545 |
| 4,483,780 | 11/1984 | Lienado | 252/135 |
| 4,511,513 | 4/1985 | Guth et al. | 554/59 |
| 4,663,158 | 5/1987 | Wolfram et al. | 424/70 |
| 4,702,857 | 10/1987 | Gosselink | 252/174.21 |
| 4,711,730 | 12/1987 | Gosselink et al. | 252/8.75 |
| 4,713,194 | 12/1987 | Gosselink | 252/174.23 |
| 4,749,596 | 6/1988 | Evans et al. | 427/242 |
| 4,787,989 | 11/1988 | Fanelli et al. | 252/8.6 |
| 4,808,086 | 2/1989 | Evans et al. | 427/242 |
| 4,846,995 | 7/1989 | Kud et al. | 252/174.21 |
| 4,849,126 | 7/1989 | Kud et al. | 252/174.23 |
| 4,849,257 | 7/1989 | Borcher, Sr. et al. | 427/242 |
| 4,873,003 | 10/1989 | O'Lenick, Jr. et al. | 252/8.75 |
| 4,877,896 | 10/1989 | Maldonado et al. | 560/14 |
| 4,936,551 | 6/1990 | Behler et al. | 260/400 |
| 4,937,277 | 6/1990 | O'Lenick, Jr. | 524/318 |
| 4,956,447 | 9/1990 | Gosselink et al. | 528/272 |
| 4,976,879 | 12/1990 | Maldonado et al. | 252/8.7 |
| 4,999,128 | 3/1991 | Sonenstein | 252/174.14 |
| 5,160,450 | 11/1992 | Okahara et al. | 252/174.21 |
| 5,171,475 | 12/1992 | Freiesleben | 252/312 |
| 5,236,615 | 8/1993 | Trinh et al. | 252/174.11 |
| 5,405,542 | 4/1995 | Trinh et al. | 252/8.8 |
| 5,510,042 | 4/1996 | Hartman et al. | 252/8.8 |
| 5,534,197 | 7/1996 | Scheibel et al. | 510/356 |

FOREIGN PATENT DOCUMENTS

| | | | |
|---|---|---|---|
| 0 185 427 | 6/1986 | European Pat. Off. | C08G 63/66 |
| 42 32 414 A1 | 9/1992 | Germany | C07C 317/18 |
| WO 93/25644 | 12/1992 | WIPO | C11B 1/10 |

OTHER PUBLICATIONS

Chemtech, Mar. 1993, pp. 30–33.
J.Am.Chem.Soc., vol. 115, (1993), pp. 10083–10090.

*Primary Examiner*—Richard D. Lovering
*Attorney, Agent, or Firm*—John A. Shedden

[57] ABSTRACT

A composition comprising a conventional surfactant, a gemini surfactant and a polymeric soil release agent. The conventional surfactant comprises a hydrophilic group and a hydrophobic group. The gemini surfactant comprises two surfactant moieties attached to each other by a spacer moiety; each surfactant moiety having at least one hydrophilic group and at least one hydrophobic group. The polymeric soil release agent can be any conventional polymeric soil release agent, but preferably comprising PET-POET copolymer. The compositions are useful as surfactant additive packages, detergents and fabric softeners.

19 Claims, No Drawings

ENHANCEMENT OF SOIL RELEASE WITH GEMINI SURFACTANTS

BACKGROUND OF THE INVENTION

1. Field of the Invention

The present invention relates to compositions and methods of use of gemini surfactants to allow better deposition of polymeric soil release agents with surfactant systems. More particularly, the present invention relates to compositions and methods of use of low concentrations of gemini surfactants to allow the improved deposition of polymeric soil release agents in the presence of typical detergent ingredients, especially highly anionic surfactant systems.

2. Background Discussion

Soil release agents are key ingredients in cleaning, e.g., textile laundry and hard surface such as carpet-cleaning; and textile treating.

These soil release agents are commonly applied during manufacture of clothing or textile fiber. The primary purpose of the soil release agents is to make it easier to clean the textile fibers by home cleaning methods using conventional household machines or cleaners.

For example, in laundering processes normally employed, such as washing in a conventional home washing machine or hand washing with detergent bars, it is usually very difficult to remove soil and/or oily stains from textile material. Moreover, assuming that the undesirable materials are removed from the textile and/or a fairly clean textile material is being washed, soil remaining in the wash water is often redeposited onto the textile material prior to the end of the wash cycle. Hence, when the textile material is removed from the washing machine and subsequently dried, it has not been properly cleaned. Thus, textile material after use rarely assumes a truly clean appearance, but instead tends to gray and/or yellow due to the soil and/or oily materials deposited or redeposited and remaining thereon.

Also, synthetic fibers, and, therefore, fabrics having synthetic fibers incorporated therein or made entirely of synthetic fibers, are hydrophobic and oleophilic. Therefore, the oleophilic characteristics of the fiber permit oil and grime to be readily embedded in the fiber, and the hydrophobic properties of the fiber prevent water from entering the fiber to remove the contaminants from the fiber.

One remedy to the soil removal and soil redeposition problem is to deposit a finish onto the fiber to impart a hydrophilic character to the fiber. Attempts have been made to reduce the oleophilic characteristics of these synthetic fibers by coating the fibers with a coating that is oleophobic, i.e., will hinder the attachment of soil and oil materials to the fibers. Many polymer systems have been proposed which are capable of forming a film around the fibers that constitute the textile material, particularly acid emulsion polymers prepared from organic acids having reactive points of unsaturation. These treating polymers are known as soil-release agents.

Typical of the soil release agents that have been developed for synthetic fibers and fabrics, are the copolymers of ethylene glycol and terephthalic acid for the treatment of Dacron, Fortrel, Kodel and Blue C Polyester, trademarks of various synthetic fibers and fabrics.

Among the leading soil release agents developed for laundering purposes are the polyesters exemplified in U.S. Pat. Nos. 3,962,152; 3,416,952; 4,132,680; 4,201,824; 4,423,557; 4,349,688; 3,959,230; 3,893,929; 3,712,873; and 4,116,885. Generally these agents are polyester polymers containing terephthalate and/or urethane groups to improve water compatibility.

The term "soil-release" in accordance with the present invention refers to the ability of the fabric to be washed or otherwise treated to remove soil and/or oily materials that have come into contact with the fabric. The present invention does not wholly prevent the attachment of soil or oil materials to the fabric, but hinders such attachment and improves the cleanability of the fabric.

Concentrated solutions of soil-release polymers have been padded onto fabrics by textile manufacturers to impart a permanent soil-release finish to the fabric. As the amount of soil-release polymer on the fabric is increased, the ability of the fabric to release soil is increased. However, fabrics with this permanent soil-release finish possess many disadvantages. As the amount of soil-release polymer on the fabric is increased, the fabric has a tendency to become stiff and lose the desirable hand characteristic of the fabric. Thus, the upper limit on the amount of soil-release polymer to be used is determined by economics and the resulting adverse effect on the fabric. Fabrics with a heavy application of soil-release polymer do not have the same desirable appearance and hand as the same fabrics without the soil-release coating. Thus, practically speaking, there is a set concentration range of soil-release agent that can be applied, dictated by commercial requirements.

Some soil-release polymers are effective fabric treating agents even at very low levels on the fabric, at which levels the appearance and hand of the fabric are not adversely affected. Thus, this property offers an ideal method of treating a synthetic fiber containing fabric which would be to reapply a very small amount of soil-release polymer to the fabric each time the fabric is washed.

Moreover, the soil release agent is preferably reapplied when the fabric is washed because the original soil release agent, applied to the fabric during manufacture, washes out after repeated washing by the consumer.

The problem is to get the soil release agent in the detergent solution to adequately deposit and remain on the clothing being washed. A number of theories have been proposed to explain the difficulties encountered when one tries to enhance this soil release agent deposition during wash process. One theory suggests that the urfactants in the detergent may complex with the soil release agent, thus inhibiting he deposition of the agent onto the fabric. Another theory has proposed that the surfactants in the detergent compositions compete with the soil release agents for sites on the fabric. This competition prevents the soil release agents from getting to the fabric.

Anionic surfactants such as alkylbenzenesulfonates, alkylether sulfates, etc., are known to have antagonistic effects on the polymer deposition. These antagonistic effects are further exacerbated because anionic surfactants are generally used at high concentrations for general soil and stain removal performance.

While conventional surfactants generally have one hydrophilic group and one hydrophobic group, recently a group of compounds having at least two hydrophobic groups and at least two hydrophilic groups per molecule have been introduced. These have become known as "gemini surfactants" in the literature, e.g., *Chemtech*, March 1993, pp 30–33, and *J. American Chemical Soc.*, 115, 10083–10090 (1993) and the references cited therein. Other gemini surfactant compounds, that is, compounds having at least two hydrophilic groups and at least two hydrophobic groups are also disclosed in literature, but often are not referred to expressly as gemini surfactants.

Prior to the present invention, many synergistic benefits of mixtures of gemini surfactants and other ingredients were unknown. It would be a major achievement to provide a detergent composition that would enhance deposition of soil release agents on textile material being washed by the consumer and, thus, provide lasting soil release properties for the life of the material.

OBJECTS OF THE INVENTION

An object of the present invention is to provide detergent compositions with enhanced soil release properties.

Another object of the present invention is to provide textile detergent compositions comprising conventional surfactant, soil release agent and gemini surfactant.

Another object of the present invention is to provide detergency and soil release benefits in compositions which also act as fabric softeners.

These and other objects will become apparent from the description of the invention in the present specification.

SUMMARY OF THE INVENTION

The present invention relates to detergent compositions having enhanced soil release properties. These compositions comprise a first surfactant, a second surfactant and a soil release agent. The first surfactant referred to is a conventional surfactant and has a single hydrophobic group and a single hydrophilic group per molecule. The second surfactant is a gemini surfactant having at least two hydrophobic groups and at least two hydrophilic groups per molecule. Preferably the hydrophilic groups are the same and the hydrophobic groups are the same. The soil release agents are any of the conventional soil release agents well known by those skilled in the art. However, non-ionic soil release agents are preferred.

It has been unexpectedly found that blends of the gemini surfactants with certain conventional well known anionic, nonionic, cationic and amphoteric surfactants provide synergistic effects in relation to causing soil release agents to deposit and remain on the washed substrate, e.g., textiles. Serendipitously, the present invention not only promotes the deposition of soil release agents, but also enhances soil removal, general detergency, and secondary properties such as soil anti-redeposition.

DETAILED DESCRIPTION OF THE PREFERRED EMBODIMENTS

The detergent compositions of the present invention achieve their unexpectedly superior soil release properties by combining a first surfactant, a second surfactant and a soil release agent. The first surfactant is selected from conventional well known non-gemini surfactants discussed in detail below. The second surfactant is selected from gemini surfactants and the soil release agent is selected from conventional well known soil release agents also discussed in detail below.

I. First Conventional Surfactants

In contrast to second (gemini) surfactants, the first or conventional surfactants have only a single hydrophobic group (head) and a single hydrophilic group (tail). It should be apparent that even non-gemini amphoteric surfactants, having a hydrophilic group with both positive and negative charges, is defined as having only a single hydrophilic group.

A. Nonionic Surfactants

Nonionic surfactants, including those having an HLB of from 5 to 17, are well known in the detergency art. Examples of such surfactants are listed in U.S. Pat. No. 3,717,630, Booth, issued Feb. 20, 1973, and U.S. Pat. No. 3,332,880, Kessler et al., issued Jul. 25, 1967, each of which is incorporated herein by reference. Nonlimiting examples of suitable nonionic surfactants which may be used in the present invention are as follows:

(1) The polyethylene oxide condensates of alkyl phenols. These compounds include the condensation products of alkyl phenols having an alkyl group containing from about 6 to 12 carbon atoms in either a straight chain or branched chain configuration with ethylene oxide, said ethylene oxide being present in an amount equal to 5 to 25 moles of ethylene oxide per mole of alkyl phenol. The alkyl substituent in such compounds can be derived, for example, from polymerized propylene, diisobutylene, and the like. Examples of compounds of this type include nonyl phenol condensed with about 9.5 moles of ethylene oxide per mole of nonyl phenol; dodecylphenol condensed with about 12 moles of ethylene oxide per mole of phenol; dinonyl phenol condensed with about 15 moles of ethylene oxide per mole of phenol; and diisooctyl phenol condensed with about 15 moles of ethylene oxide per mole of phenol. Commercially available nonionic surfactants of this type include Igepal CO-630, marketed by Rhone-Poulenc Inc. and Triton X-45, X-114, X-100, and X-102, all marketed by Union Carbide.

(2) The condensation products of aliphatic alcohols with from about 1 to about 25 moles of ethylene oxide. The alkyl chain of the aliphatic alcohol can either be straight or branched, primary or secondary, and generally contains from about 8 to about 22 carbon atoms. Examples of such ethoxylated alcohols include the condensation product of myristyl alcohol condensed with about 10 moles of ethylene oxide per mole of alcohol; and the condensation product of about 9 moles of ethylene oxide with coconut alcohol (a mixture of fatty alcohols with alkyl chains varying in length from 10 to 14 carbon atoms). Examples of commercially available nonionic surfactants in this type include Tergitol 15-S-9, marketed by Union Carbide Corporation, Neodol 45-9, Neodol 23-6.5, Neodol 45-7, and Neodol 45-4, marketed by Shell Chemical Company.

(3) The condensation products of ethylene oxide with a hydrophobic base formed by the condensation of propylene oxide with propylene glycol. The hydrophobic portion of these compounds typically has a molecular weight of from about 1500 to 1800 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic surfactants, marketed by Wyandotte Chemical Corporation.

(4) The condensation products of ethylene oxide with the product resulting from the reaction of propylene oxide and ethylenediamine. The hydrophobic moiety of these products consists of the reaction product of ethylenediamine and excess propylene oxide, said moiety having a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic compounds, marketed by Wyandotte Chemical Corporation.

(5) Semi-polar nonionic detergent surfactants include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of about 10 to 18 carbon atoms and 2 moieties selected from the group consisting of alkyl groups and hydroxyalkyl groups containing from about 1 to 3 carbons atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Preferred semi-polar nonionic detergent surfactants are the amine oxide detergent surfactants having the formula

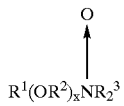

$$R^1(OR^2)_xNR_2^3$$

wherein $R^1$ is an alkyl, hydroxy alkyl, or alkyl phenyl group or mixtures thereof containing from about 8 to about 22 carbon atoms. $R^2$ is an alkylene or hydroxy alkylene group containing from 2 to 3 carbon atoms or mixtures thereof, x is from 0 to about 3 and each $R^3$ is an alkyl or hydroxy alkyl group containing from 1 to about 3 carbon atoms or a polyethylene oxide group containing from one to about 3 ethylene oxide groups and said $R^3$ groups can be attached to each other, e.g., through an oxygen or nitrogen atom to form a ring structure.

Preferred amine oxide detergent surfactants are $C_{10}$–$C_{18}$ alkyl dimethyl amine oxide, $C_8$–$C_{18}$ alkyl dihydroxy ethyl amine oxide, and $C_{8-12}$ alkoxy ethyl dihydroxy ethyl amine oxide.

Nonionic detergent surfactants (1)–(4) are conventional ethoxylated nonionic detergent surfactants and mixtures thereof can be used.

Preferred alcohol ethoxylate nonionic surfactants for use in the compositions of the liquid, powder, and gel applications are biodegradable and have the formula

$$R(OC_2H_4)_nOH$$

wherein R is a primary or secondary alkyl chain of from about 8 to about 22, preferably from about 10 to about 20 carbon atoms and n is an average of from about 2 to about 12, particularly from about 2 to about 9. The nonionics have an HLB (hydrophilic-lipophilic balance) of from about 5 to about 17, preferably from about 6 to about 15. HLB is defined in detail in *Nonionic Surfactants*, by M. J. Schick, Marcel Dekker, Inc., 1966, pages 606–613, incorporated herein by reference. In preferred nonionic surfactants, n is from 3 to 7. Primary linear alcohol ethoxylates (e.g., alcohol ethoxylates produced from organic alcohols which contain about 20% 2-methyl branched isomers, commercially available from Shell Chemical Company under the trademark Neodol) are preferred from a performance standpoint.

Particularly preferred nonionic surfactants for use in liquid, powder, and gel applications include the condensation product of $C_{10}$ alcohol with 3 moles of ethylene oxide; the condensation product of tallow alcohol with 9 moles of ethylene oxide; the condensation product of coconut alcohol with 5 moles of ethylene oxide; the condensation product of coconut alcohol with 6 moles of ethylene oxide; the condensation product of $C_{12}$ alcohol with 5 moles of ethylene oxide; the condensation product of $C_{12-13}$ alcohol with 6.5 moles of ethylene oxide, and the same condensation product which is stripped so as to remove substantially all lower ethoxylate and nonethoxylated fractions; the condensation product of $C_{12-13}$ alcohol with 2.3 moles of ethylene oxide, and the same condensation product which is stripped so as to remove substantially all lower ethoxylated and nonethoxylated fractions; the condensation product of $C_{12-13}$ alcohol with 9 moles of ethylene oxide; the condensation product of $C_{14-15}$ alcohol with 2.25 moles of ethylene oxide; the condensation product of $C_{14-15}$ alcohol with 4 moles of ethylene oxide; the condensation product of $C_{14-15}$ alcohol with 7 moles of ethylene oxide; and the condensation product of $C_{14-15}$ alcohol with 9 moles of ethylene oxide. For bar soap applications, nonionic surfactants are preferably solids at room temperature with a melting point above about 25° C., preferably above about 30° C. Bar compositions of the present invention made with lower melting nonionic surfactants are generally too soft, not meeting the bar firmness requirements of the present invention.

Also, as the level of nonionic surfactant increases, i.e., above about 20% by weight of the surfactant, the bar can generally become oily.

Examples of nonionic surfactants usable herein, but not limited to bar applications, include fatty acid glycerine and polyglycerine esters, sorbitan sucrose fatty acid esters, polyoxyethylene alkyl and alkyl allyl ethers, polyoxyethylene lanolin alcohol, glycerine and polyoxyethylene glycerine fatty acid esters, polyoxyethylene propylene glycol and sorbitol fatty acid esters, polyoxyethylene lanolin, castor oil or hardened castor oil derivatives, polyoxyethylene fatty acid amides, polyoxyethylene alkyl amines, alkylpyrrolidone, glucamides, alkylpolyglucosides, and mono- and dialkanol amides.

Typical fatty acid glycerine and polyglycerine esters, as well as typical sorbitan sucrose fatty acid esters, fatty acid amides, and polyethylene oxide/polypropylene oxide block copolymers are disclosed by U.S. Pat. No. 5,510,042, Hartman et al, incorporated herein by reference.

The castor oil derivatives are typically ethoxylated castor oil. It is noted that other ethoxylated natural fats, oils or waxes are also suitable.

Polyoxyethylene fatty acid amides are made by ethoxylation of fatty acid amides with one or two moles of ethylene oxide or by condensing mono-or diethanol amines with fatty acid.

Polyoxyethylene alkyl amines include those of formula: $RNH—(CH_2CH_2O)_n—H$, wherein R is $C_6$ to $C_{22}$ alkyl and n is from 1 to about 100.

Monoalkanol amides include those of formula: $RCONHR^1OH$, wherein R is $C_6$–$C_{22}$ alkyl and $R^1$ is $C_1$ to $C_6$ alkylene. Dialkanol amides are typically mixtures of:

diethanolamide: $RCON(CH_2CH_2OH)_2$;
amide ester: $RCON(CH_2CH_2OH)—CH_2CH_2OOCR$;
amine ester: $RCOOCH_2CH_2NHCH_2CH_2OH$; and
amine soap: $RCOOH_2N(CH_2CH_2OH)_2$, wherein R in the above formulas is an alkyl of from 6 to 22 carbon atoms.

Examples of preferred but not limiting surfactants for detergent bar products are the following:
Straight-Chain Primary Alcohol Alkoxylates The deca-, undeca-, dodeca-, tetradeca-, and pentadeca-ethoxylates of n-hexadecanol, and n-hexadecanol, and n-octadecanol having an HLB within the range recited herein are useful nonionics in the context of this invention. Exemplary ethoxylated primary alcohols useful herein as the conventional nonionic surfactants of the compositions are n-$C_{18}$EO(10); n-$C_{14}$EO(13); and n-$C_{10}$EO(11). The ethoxylates of mixed natural or synthetic alcohols in the "tallow" chain length range are also useful herein. Specific examples of such materials include tallow-alcohol-EO(11), tallow-alcohol-EO(18), and tallow-alcohol-EO(25).

Straight-Chain Secondary Alcohol Alkoxylates

The deca-, undeca-, dodeca-, tetradeca-, pentadeca-, octadeca-, and nonadeca-ethoxylates of 3-hexadecanol, 2-octadecanol, 4-eicosanol, and 5-eicosanol having an HLB within the range recited herein are useful conventional nonionics in the context of this invention. Exemplary ethoxylated secondary alcohols useful herein are 2-$C_{16}$EO(11); 2-$C_{20}$EO(11); and 2-$C_{16}$EO(14).

Alkyl Phenol Alkoxylates

As in the case of the alcohol alkoxylates, the hexa-through octadeca-ethoxylates of alkylated phenols, particularly monohydric alkylphenols, having an HLB within the range recited herein are useful as conventional nonionic surfactants in the instant compositions. The hexa- through octadeca-ethoxylates of p-tridecylphenol, m-pentadecylphenol, and the like, are useful herein. Exemplary ethoxylated alkylphenols useful in the mixtures herein are: p-tridecylphenol EO(11) and p-pentadecylphenol EO(18). Especially preferred is Nonyl Nonoxynol-49 known as Igepal® DM-880 from Rhone-Poulenc Inc.

As used herein and as generally recognized in the art, a phenylene group in the nonionic formula is the equivalent of an alkylene group containing from 2 to 4 carbon atoms. For present purposes, nonionics containing a phenylene group are considered to contain an equivalent number of carbon atoms calculated as the sum of the carbon atoms in the alkyl group plus about 3.3 carbon atoms for each phenylene group.

Olefinic Alkoxylates

The alkenyl alcohols, both primary and secondary, and alkenyl phenols corresponding to those disclosed immediately hereinabove can be ethoxylated to an HLB within the range recited herein and used as the conventional nonionic surfactants of the instant compositions.

Branched Chain Alkoxylates

Branched chain primary and secondary alcohols which are available can be ethoxylated and employed as conventional nonionic surfactants in compositions herein.

The above ethoxylated nonionic surfactants are useful in the present compositions alone or in combination, and the term "nonionic surfactant" encompasses mixed nonionic surface active agents.

Alkylpolysaccharides

Still further suitable nonionic surfactants of this invention include alkylpolysaccharides, preferably alkylpolyglycosides of the formula:

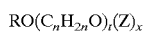

wherein

Z is derived from glycose;

R is a hydrophobic group selected from the group consisting of a $C_{10}$–$C_{18}$, preferably a $C_{12}$–$C_{14}$, alkyl group, alkyl phenyl group, hydroxyalkyl group, hydroxyalkylphenyl group, and mixtures thereof;

n is 2 or 3; preferably 2;

t is from 0 to 10; preferably 0; and x is from 1.5 to 8; preferably 1.5 to 4; more preferably from 1.6 to 2.7.

These surfactants are disclosed in U.S. Pat. Nos. 4,565,647, Llenado, issued Jan. 21, 1986; 4,536,318, Cook et al., issued Aug. 20, 1985; 4,536,317, Llenado et al., issued Aug. 20, 1985; 4,599,188 Llenado, issued Jul. 8, 1986; and 4,536,319, Payne, issued Aug. 20, 1985; all of which are incorporated herein by reference.

The compositions of the present invention can also comprise mixtures of the above nonionic surfactants.

A thorough discussion of nonionic surfactants for detergent bar and liquid products is presented by U.S. Pat. Nos. 5,510,042, Hartman et al., and 4,483,779, Llenado, et al., incorporated herein by reference.

B. Anionic Surfactants

Anionic surfactants include any of the known hydrophobes attached to a carboxylate, sulfonate, sulfate or phosphate polar, solubilizing group including salts. Salts may be the sodium, potassium, ammonium and amine salts of such surfactants. Useful anionic surfactants can be organic sulfuric reaction products having in their molecular structure an alkyl group containing from about 8 to about 22 carbon atoms and a sulfonic acid or sulfuric acid ester group, or mixtures thereof. (Included in the term "alkyl" is the alkyl portion of acyl groups.) Examples of this group of synthetic detersive surfactants which can be used in the present invention are the alkyl sulfates, especially those obtained by sulfating the higher alcohols ($C_8$–$C_{18}$ carbon atoms) produced from the glycerides of tallow or coconut oil; and alkyl benzene sulfonates.

Other useful anionic surfactants herein include the esters of alpha-sulfonated fatty acids preferably containing from about 6 to 20 carbon atoms in the ester group; 2-acyloxyalkane-1-sulfonic acids preferably containing from about 2 to 9 carbon atoms in the acyl group and from about 9 to about 23 carbon atoms in the alkane moiety; alkyl ether sulfates preferably containing from about 10 to 20 carbon atoms in the alkyl group and from about 1 to 30 moles of ethylene oxide; olefin sulfonates preferably containing from about 12 to 24 carbon atoms; and beta-alkyloxy alkane sulfonates preferably containing from about 1 to 3 carbon atoms in the alkyl group and from about 8 to 20 carbon atoms in the alkane moiety.

Anionic surfactants based on the higher fatty acids, i.e., "soaps" are useful anionic surfactants herein. Higher fatty acids containing from about 8 to about 24 carbon atoms and preferably from about 10 to about 20 carbon atoms and the coconut and tallow soaps can also be used herein as corrosion inhibitors.

Preferred water-soluble anionic organic surfactants herein include linear alkyl benzene sulfonates containing from about 10 to about 18 carbon atoms in the alkyl group; branched alkyl benzene sulfonates containing from about 10 to about 18 carbon atoms in the alkyl group; the tallow range alkyl sulfates; the coconut range alkyl glyceryl sulfonates; alkyl ether (ethoxylated) sulfates wherein the alkyl moiety contains from about 12 to 18 carbon atoms and wherein the average degree of ethoxylation varies between 1 and 12, especially 3 to 9; the sulfated condensation products of tallow alcohol with from about 3 to 12, especially 6 to 9, moles of ethylene oxide; and olefin sulfonates containing from about 14 to 16 carbon atoms.

Specific preferred anionics for use herein include: the linear $C_{10}$–$C_{14}$ alkyl benzene sulfonates (LAS); the branched $C_{10}$–$C_{14}$ alkyl benzene sulfonates (ABS); the tallow alkyl sulfates, the coconut alkyl glyceryl ether sulfonates; the sulfated condensation products of mixed $C_{10}$–$C_{18}$ tallow alcohols with from about 1 to about 14 moles of ethylene oxide; and the mixtures of higher fatty acids containing from 10 to 18 carbon atoms.

It is to be recognized that any of the foregoing anionic surfactants can be used separately herein or as mixtures. Moreover, commercial grades of the surfactants can contain non-interfering components which are processing by-products. For example, commercial alkaryl sulfonates, preferably $C_{10}$–$C_{14}$, can comprise alkyl benzene sulfonates, alkyl toluene sulfonates, alkyl naphthalene sulfonates and alkyl poly-benzenoid sulfonates. Such materials and mixtures thereof are fully contemplated for use herein.

Other examples of the anionic surfactants used herein include fatty acid soaps, ether carboxylic acids and salts thereof, alkane sulfonate salts, α-olefin sulfonate salts, sulfonate salts of higher fatty acid esters, higher alcohol sulfate ester or ether ester salts, alkyl, preferably higher alcohol phosphate ester and ether ester salts, and condensates of higher fatty acids and amino acids.

Fatty acid soaps include those having the formula: R—C(O)OM, wherein R is $C_6$ to $C_{22}$ alkyl and M is preferably sodium.

Salts of ether carboxylic acids and salts thereof include those having the formula: R—$(OR^1)_n$—$OCH_2C(O)OM$, wherein R is $C_6$ to $C_{22}$ alkyl, $R^1$ is $C_2$ to $C_{10}$, preferably $C_2$ alkyl, and M is preferably sodium.

Alkane sulfonate salts and α-olefin sulfonate salts have the formula: R—$SO_3M$, wherein R is $C_6$ to $C_{22}$ alkyl or α-olefin, respectively, and M is preferably sodium.

Sulfonate salts of higher fatty acid esters include those having the formula:

$$RC(O)O-R^1-SO_3M,$$

wherein R is $C_{12}$ to $C_{22}$ alkyl, $R^1$ is $C_1$ to $C_{18}$ alkyl and M is preferably sodium.

Higher alcohol sulfate ester salts include those having the formula:

$$RC(O)O-R^1-OSO_3M,$$

wherein R is $C_{12}$–$C_{22}$ alkyl, $R^1$ is $C_1$–$C_{18}$ hydroxyalkyl, M is preferably sodium.

Higher alcohol sulfate ether ester salts include those having the formula:

$$RC(O)(OCH_2CH_2)_x-R^1-OSO_3M,$$

wherein R is $C_{12}$–$C_{22}$ alkyl, $R^1$ is $C_1$–$C_{18}$ hydroxyalkyl, M is preferably sodium and x is an integer from 5 to 25.

Higher alcohol phosphate ester and ether ester salts include compounds of the formulas:

$$R-(OR^1)_n-OPO(OH)(OM);$$

$$(R-(OR^1)_n-O)_2PO(OM);$$

and $$(R-(OR^1)_n-O)_3-PO,$$

wherein R is alkyl or hydroxyalkyl of 12 to 22 carbon atoms, $R^1$ is $C_2H_4$, n is an integer from 5 to 25, and M is preferably sodium.

Other anionic surfactants herein are sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

C. Cationic Surfactants

Preferred cationic surfactants of the present invention are the reaction products of higher fatty acids with a polyamine selected from the group consisting of hydroxyalkylalkylenediamines and dialkylenetriamines and mixtures thereof.

A preferred component is a nitrogenous compound selected from the group consisting of:

(i) the reaction product mixtures of higher fatty acids with hydroxyalkylalkylenediamines in a molecular ratio of about 2:1, said reaction product containing a composition having a compound of the formula:

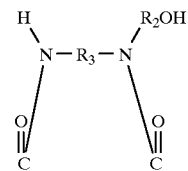

wherein $R_1$ is an acyclic aliphatic $C_{15}$–$C_{21}$ hydrocarbon group and $R_2$ and $R_3$ are divalent $C_1$–$C_3$ alkylene groups; commercially available as Mazamide 6 from PPG;

(ii) the reaction product of higher fatty acids with dialkylenetriamines in a molecular ratio of about 2:1; said reaction product containing a composition having a compound of the formula:

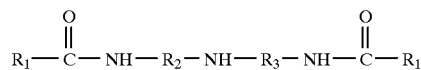

wherein $R_1$, $R_2$ and $R_3$ are as defined above; and mixtures thereof. Another preferred component is a cationic nitrogenous salt containing one long chain acyclic aliphatic $C_{15}$–$C_{22}$ hydrocarbon group selected from the group consisting of:

(i) acyclic quaternary ammonium salts having the formula:

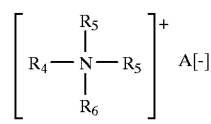

wherein $R_4$ is an acyclic aliphatic $C_{15}$–$C_{22}$ hydrocarbon group, $R_5$ and $R_6$ are $C_1$–$C_4$ saturated alkyl or hydroxyalkyl groups, and A [-] is an anion, especially as described in more detail hereinafter, examples of these surfactants are sold by Sherex Chemical Company under the Adgen trademarks;

(ii) substituted imidazolinium salts having the formula:

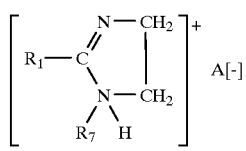

wherein $R_1$ is an acyclic aliphatic $C_{15}$–$C_{21}$ hydrocarbon group, $R_7$ is a hydrogen or a $C_1$–$C_4$ saturated alkyl or hydroxyalkyl group, and A[–] is an anion;

(iii) substituted imidazolinium salts having the formula:

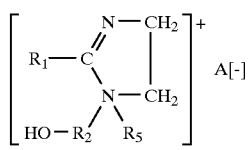

wherein $R_2$ is a divalent $C_1$–$C_3$ alkylene group and $R_1$, $R_5$ and A[–] are as defined above; an example of which is commercially available under the Monaquat ISIES trademark from Mona Industries, Inc.;

(iv) alkylpyridinium salts having the formula:

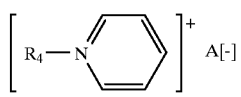

wherein $R_4$ is an acyclic aliphatic $C_{16}$–$C_{22}$ hydrocarbon group and A[–] is an anion; and (v) alkanamide alkylene pyridinium salts having the formula:

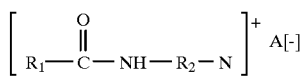

wherein $R_1$ is an acyclic aliphatic $C_{15}$–$C_{21}$ hydrocarbon group, $R_2$ is a divalent $C_1$–$C_3$ alkylene group, and A [–] is an ion group; and mixtures thereof.

Another class of preferred cationic nitrogenous salts having two or more long chain acyclic aliphatic $C_{15}$–$C_{22}$ hydrocarbon groups or one said group and an arylalkyl group are selected from the group consisting of:

(i) acyclic quaternary ammonium salts having the formula:

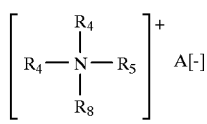

wherein each $R_4$ is an acyclic aliphatic $C_{15}$–$C_{22}$ hydrocarbon group, $R_5$ is a $C_1$–$C_4$ saturated alkyl or hydroxyalkyl group, $R_8$ is selected from the group consisting of $R_4$ and $R_5$ groups, and A[–] is an anion defined as above; examples of which are commercially available from Sherex Company under the Adgen trademarks;

(ii) diamido quaternary ammonium salts having the formula:

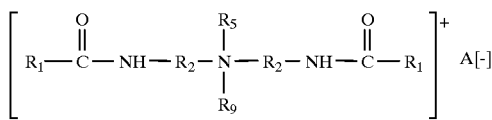

wherein each $R_1$ is an acyclic aliphatic $C_{15}$–$C_{21}$ hydrocarbon group, $R_2$ is a divalent alkylene group having 1 to 3 carbon atoms, $R_5$ and $R_9$ are $C_1$–$C_4$ saturated alkyl or hydroxyalkyl groups, and A[–] is an anion; examples of which are sold by Sherex Chemical Company under the Varisoft trademark;

(iii) diamino alkoxylated quaternary ammonium salts having the formula:

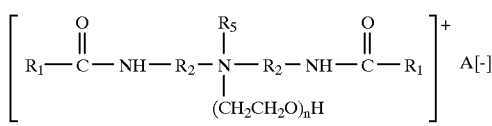

wherein n is equal to 1 to about 5, and $R_1$, $R_2$, $R_5$ and A [–] are as defined above;

(iv) quaternary ammonium compounds having the formula:

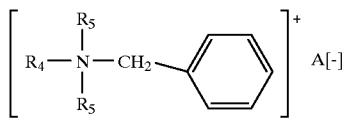

wherein each $R_4$ is an acyclic aliphatic $C_{15}$–$C_{22}$ hydrocarbon group, each $R_5$ is a $C_1$–$C_4$ saturated alkyl or hydroxyalkyl group, and A[–] is an anion; examples of such surfactants are available from Onyx Chemical Company under the Ammonyx® 490 trademark;

(v) substituted imidazolinium salts having the formula:

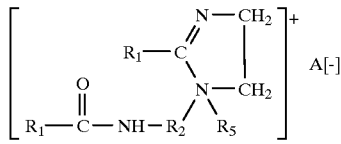

wherein each $R_1$ is an acyclic aliphatic $C_{15}$–$C_{21}$ hydrocarbon group, $R_2$ is a divalent alkylene group having 1 to 3 carbon atoms, and $R_5$ and A [–] are as defined above; examples are commercially available from Sherex Chemical Company under the Varisoft 475 and Varisoft 445 trademarks; and (vi) substituted imidazolinium salts having the formula:

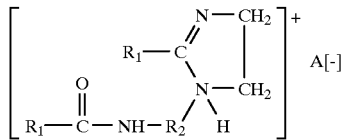

wherein $R_1$, $R_2$ and A—are as defined above; and mixtures thereof.

The more preferred cationic conventional surfactant is selected from the group consisting of an alkyltrimethylammonium salt, a dialkyldimethylammonium salt, an alkyldimethylbenzylammonium salt, an alkylpyridinium salt, an alkylisoquinolinium salt, benzethonium chloride, and an acylamino acid cationic surfactant.

Anion A

In the cationic nitrogenous salts herein, the anion A [−] provides electrical neutrality. Most often, the anion used to provide electrical neutrality in these salts is a halide, such as chloride, bromide, or iodide. However, other anions can be used, such as methylsulfate, ethylsulfate, acetate, formate, sulfate, carbonate, and the like. Chloride and methylsulfate are preferred herein as anion A.

Cationic surfactants are commonly employed as fabric softeners in compositions added during the rinse cycle of clothes washing. Many different types of fabric conditioning agents have been used in rinse cycle added fabric conditioning compositions as disclosed by U.S. Pat. No. 5,236,615, Trinh et al. and U.S. Pat. No. 5,405,542, Trinh et al., both patents herein incorporated by reference in their entirety. The most favored type of agent has been the quaternary ammonium compounds. Many such quaternary ammonium compounds are disclosed for example, by U.S. Pat. No. 5,510,042, Hartman et al. incorporated herein by reference in its entirety. These compounds may take the form of noncyclic quaternary ammonium salts having preferably two long chain alkyl groups attached to the nitrogen atoms. Additionally, imidazolinium salts have been used by themselves or in combination with other agents in the treatment of fabrics as disclosed by U.S. Pat. No. 4,127,489, Pracht, et al., incorporated herein by reference in its entirety. U.S. Pat. No. 2,874,074, Johnson discloses using imidazolinium salts to condition fabrics; and U.S. Pat. No. 3,681,241, Rudy, and U.S. Pat. No. 3,033,704, Sherrill et al. disclose fabric conditioning compositions containing mixtures of imidazolinium salts and other fabric conditioning agents. These patents are incorporated herein by reference in their entirety.

D. Amphoteric Surfactants

Amphoteric surfactants have a positive or negative charge or both on the hydrophilic part of the molecule in acidic or alkaline media.

Examples of the amphoteric surfactants which can be used herein include amino acid, betaine, sultaine, phosphobetaines, imidazolinium derivatives, soybean phospholipids, and yolk lecithin. Examples of suitable amphoteric surfactants include the alkali metal, alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates and alkyl amphopropionates wherein alkyl represents an alkyl group having 6 to 20 carbon atoms. Other suitable amphoteric surfactants include alkyliminopropionates, alkyl iminodipropionates and alkyl amphopropylsulfonates having between 12 and 18 carbon atoms, alkylbetaines and amidopropylbetaines and alkylsultaines and alkylamidopropylhydroxy sultaines wherein alkyl represents an alkyl group having 6 to 20 carbon atoms are especially preferred.

Particularly useful amphoteric surfactants include both mono and dicarboxylates such as those of the formulae:

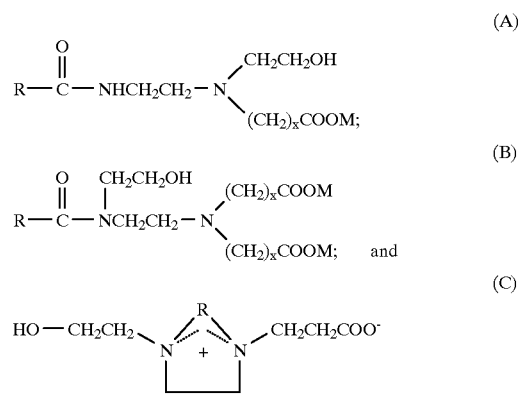

wherein R is an alkyl group of 6–20 carbon atoms, x is 1 or 2 and M is hydrogen or sodium. Mixtures of the above structures are particularly preferred.

Other formulae for the above amphoteric surfactants include the following:

Alkyl Betaines

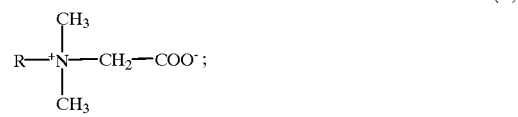

Amidopropyl Betaines

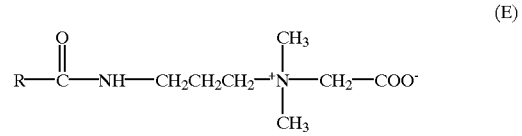

Alkyl Sultaines

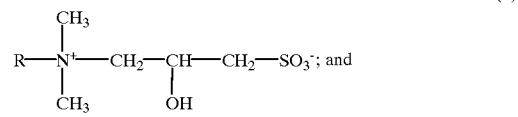

Alkyl Amidopropylhydroxy Sultaines

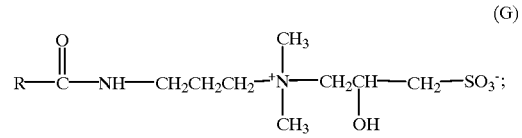

where R is an alkyl group of 6–20 carbon atoms and M is hydrogen or sodium.

Of the above amphoteric surfactants, particularly preferred are the alkali salts of alkyl amphocarboxyglycinates and alkyl amphocarboxypropionates, alkyl amphodipropionates, alkyl amphodiacetates, alkyl amphoglycinates, alkyl amphopropyl sulfonates and alkyl amphopropionates wherein alkyl represents an alkyl group having 6 to 20 carbon atoms. Even more preferred are compounds wherein the alkyl group is derived from coconut oil or is a lauryl group, for example, cocoamphodipropionate. Such cocoamphodipropionate surfactants are commercially sold under the trademarks Miranol C2M-SF CONC. and Miranol FBS by Rhone-Poulenc Inc.

Other commercially useful amphoteric surfactants are available from Rhone-Poulenc Inc. and include:

---
cocoamphoacetate (sold under the trademarks MIRANOL CM CONC. and MIRAPON FA),
cocoamphopropionate (sold under the trademarks MIRANOL CM-SF CONC. and MIRAPON FAS),
cocoamphodiacetate (sold under the trademarks MIRANOL C2M CONC. and MIRAPON FB),
lauroamphoacetate (sold under the trademarks MIRANOL HM CONC. and MIRAPON LA),
lauroamphodiacetate (sold under the trademarks MIRANOL H2M CONC. and MIRAPON LB),
lauroamphodipropionate (sold under the trademarks MIRANOL H2M SF CONC. AND MIRAPON LBS),
lauroamphodiacetate obtained from a mixture of lauric and myristic acids (sold under the trademark MIRANOL BM CONC.), and
cocoamphopropyl sulfonate (sold under the trademark MIRANOL CS CONC.)
---

Somewhat less preferred are:

---
caproamphodiacetate (sold under the trademark MIRANOL S2M CONC.),
caproamphoacetate (sold under the trademark MIRANOL SM CONC.),
caproamphodipropionate (sold under the trademark MIRANOL S2M-SF CONC.), and
stearoamphoacetate (sold under the trademark MIRANOL DM).
---

II. Gemini Surfactants

Gemini surfactants form a special class of surfactant. These surfactants have the general formula:

$$A\text{-}G\text{-}A^1$$

and get their name because they comprise two surfactant moieties $(A,A^1)$ joined by a spacer $(G)$, wherein each surfactant moiety $(A,A^1)$ has a hydrophilic group and a hydrophobic group. Generally, the two surfactant moieties $(A,A^1)$ are twins, but they can be different.

The gemini surfactants are advantageous because they have low critical micelle concentrations (cmc) and, thus, lower the cmc of solutions containing both a gemini surfactant and a conventional surfactant. Lower cmc causes better solubilization and increased detergency at lower surfactant use levels and unexpectedly enhances the deposition of the soil release polymers as claimed by this invention with demonstrated results to follow herein. Soil removal agents adhere to the fabric being laundered, much better than when mixed with only non-gemini, conventional surfactants.

Also, the gemini surfactants result in a low $pC_{20}$ value and low Krafft points. The $pC_{20}$ value is a measure of the surfactant concentration in the solution phase that will reduce the surface tension of the solvent by 20 dynes/cm. It is a measure of the tendency of the surfactant to adsorb at the surface of the solution. The Krafft point is the temperature at which the surfactant's solubility equals the cmc. Low Krafft points imply better solubility in water, and lead to greater latitude in making formulations.

Unexpectedly, the mixture of gemini surfactant with the above mentioned conventional surfactant, and the above-mentioned polymeric soil release agent, dramatically enhances the deposition of the soil release agent. The aforementioned mixture is far more effective than conventional surfactant and soil release agent formulations without the gemini surfactants.

A number of the gemini surfactants are reported in the literature, see for example, Okahara et al., J. Japan Oil Chem. Soc. 746 (Yukagaku) (1989); Zhu et al., 67 JAOCS 7,459 (July 1990); Zhu et al., 68 JAOCS 7,539 (1991); Menger et al., J. Am. Chemical Soc. 113, 1451 (1991); Masuyama et al., 41 J. Japan Chem. Soc. 4,301 (1992); Zhu et al., 69 JAOCS 1,30 (Jan. 1992); Zhu et al., 69 JAOCS 7,626 July 1992); Menger et al., 115 J. Am. Chem. Soc. 2, 10083 (1993); Rosen, Chemtech 30 (March 1993); and Gao et al., 71 JAOCS 7,771 (July 1994), all of this literature incorporated herein by reference.

Also, gemini surfactants are disclosed by U.S. Pat. Nos. 2,374,354, Kaplan; 2,524,218, Bersworth; 2,530,147 Bersworth (two hydrophobic tails and three hydrophilic heads); 3,244,724, Guttmann; 5,160,450, Okahara, et al., all of which are incorporated herein by reference.

The gemini surfactants may be anionic, nonionic, cationic or amphoteric. The hydrophilic and hydrophobic groups of each surfactant moiety $(A,A^1)$ may be any of those known to be used in conventional surfactants having one hydrophilic group and one hydrophobic group.

For example, a typical nonionic gemini surfactant, e.g., a bis-polyoxyethylene alkyl ether, would contain two polyoxyethylene alkyl ether moieties.

Each moiety would contain a hydrophilic group, e.g., polyethylene oxide, and a hydrophobic group, e.g., an alkyl chain.

Anionic and nonionic gemini surfactants which are useful in the present invention include those of the formula:

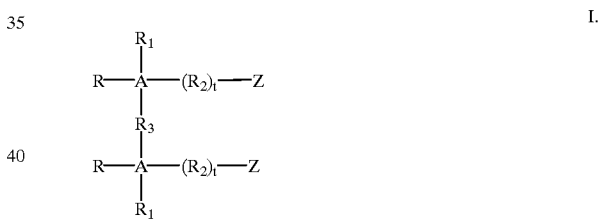

I.

wherein R is independently $C_1$ to $C_{22}$ alkyl, $R_4C(O)$—, or $R_4$—B—$R_5$— wherein R4 is $C_1$ to $C_{22}$ alkyl, $R_5$ is $C_1$ to $C_{12}$ alkyl, and B is an amide group, [—C(O)N($R_6$)—], an amino group [—N($R_6$)—], a carboxyl group [—C(O)—O—], a carbonyl group, and a polyether group [—O(EO)$_a$PO)$_b$—] wherein EO represents ethyleneoxy radicals, PO represents propyleneoxy radicals, a and b are numbers of from 0 to 100, a is preferably from about 0 to about 30 and b is preferably from about 0 to 10, wherein a plus b is at least one, and the EO and PO radicals can be randomly mixed or in discrete blocks, and $R_6$ is hydrogen or $C_1$ to $C_6$ alkyl;

$R_1$ is independently hydrogen or $C_1$ to $C_{22}$ alkyl;

$R_2$ is independently a $C_1$–$C_{10}$ alkyl, —O—, an amide group [—C(O)N($R_6$)—], a polyether group [—O(EO)$_a$(PO)$_b$—], —$R_7$—D—$R_7$— or —D—$R_7$—D wherein $R_7$ is independently a $C_1$–$C_6$ alkyl and D is —O—, —S—, an amide group [—C(O)N($R_6$)—], or an amino group [—N($R_6$)—], wherein $R_6$, a and b are as defined above. and t is independently 0 or 1.

Z is independently hydrogen, —SO$_3$Y, —P(O)(OY)$_2$, —COOY, —CH$_2$COOY, —CH$_2$—CH(OH)CH$_2$SO$_3$Y and when $R_2$ is not a polyether, Z is also —OSO$_3$Y, and —OP(O)(OY)$_2$; wherein Y is hydrogen, alkali metal such as sodium and potassium; alkaline earth metal such as magnesium and calcium; ammonium; or organic base salt such as monoethanolamine, diethanolamine, triethanolamine, triethylamine, trimethylamine, N-hydroxyethyl morpholine, and the like.

A is independently a straight chain or branched $C_1$ to $C_6$ alkyl, such as

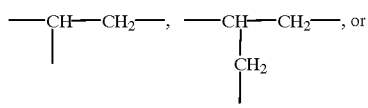

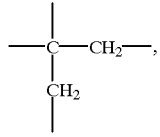

an O—$R_5$—O— group or aryl; preferably phenyl; $R_3$ is a bond, an aryl group such as a phenyl or diphenyl group, a $C_1$ to $C_{10}$ alkyl group, preferably a $C_1$ to $C_4$ alkyl group, most preferably methylene, —O—, —S—, —S—S—, —N($R_6$)—, —$R_5$—O—, —$R_5$[O(EO)$_a$(PO)$_b$—], —$D_1$—$R_8$—$D_1$— or —$R_8$—$D_1$—$R_8$— wherein $R_8$ is independently a $C_1$-$C_{10}$ alkyl group, —C(O)—, —$R_5$[O(EO)$_a$(PO)$_b$]—, —O—$R_5$—O—, or aryl, e.g. phenyl, and $D_1$ is independently —O—, —S—, —S—S—, —SO$_2$—, —C(O)—, a polyether group [—O(EO)$_a$(PO)$_b$—], an amide group [—C(O)N($R_6$)—], an amino group [—N($R_6$)—], —O—$R_5$—O—, or aryl wherein $R_5$, $R_6$, a and b are as defined above.

On the formulae of this disclosure, the term "alkali" includes substituted alkali, especially the hydroxy substituted derivatives thereof and straight as well as branched chains. When Z is hydrogen, the gemini surfactants are nonionic.

The compounds of Formula I are more fully described in copending application U.S. Ser. No. 08/292,907 filed Aug. 19, 1994, now U.S. Pat. No. 5,643,864, the entire disclosure of which is incorporated herein by reference.

Other gemini surfactants specifically useful in the present invention include gemini anionic or nonionic surfactants of the formulae:

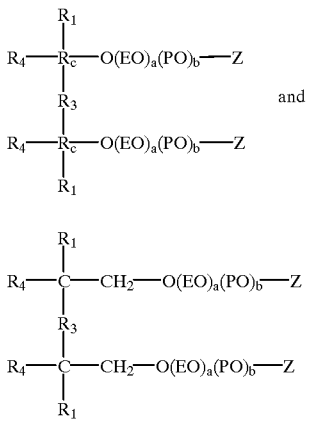

wherein $R_c$ represents aryl, preferably phenyl.

$R_1$, $R_3$, $R_4$, Y, Z, a and b are as defined above.

More specifically, these compounds comprise:

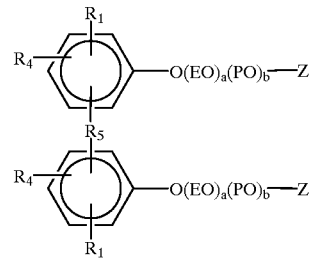

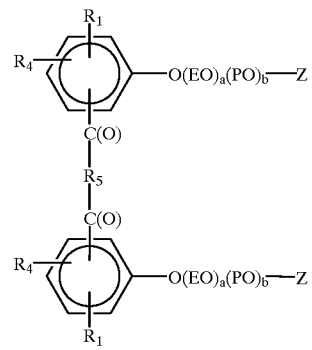

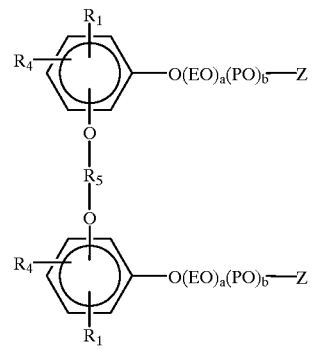

wherein $R_1$, $R_4$, $R_5$, Z, a, and b are as defined hereinbefore.

The primary hydroxyl group of these surfactants can be readily phosphated, sulfated or carboxylated by standard techniques.

The compounds included in Formula II can be prepared by a variety of synthetic routes. For instance, the compounds of Formula IV can be prepared by condensing a monoalkyl phenol with paraformaldehyde in the presence of an acid catalyst such as acetic acid. The compounds of Formula V can be synthesized by a Lewis acid catalyzed reaction of an alkylphenol with a dicarboxylic acid, e.g., terephthalic acid.

The compounds of Formula II are more fully described in copending application U.S. Ser. No. 60/009,075 filed Dec. 21, 1995, the entire disclosure of which is incorporated herein by reference.

A class of gemini surfactants that can be used in providing the improved emulsions which are operable at lower concentrations as disclosed in the present invention include a group of amphoteric, and cationic quaternary surfactants comprising compounds of the formula:

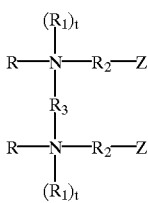
VII.

wherein R, t, and Z are as defined hereinbefore. $R_1$ is as defined before and includes the $[—(EO)_a(PO)_bO—]H$ moiety. $R_2$ is as defined before, however, D includes the following moieties: $—N(R_6)—C(O)—R_5—CH_2O—$ and $—N(R_6)—C(O)—R_5—N(R_6)—R_4—$. When t is zero, the compounds are amphoteric and when t is 1, the compounds are cationic quaternary compounds. $R_3$ is selected from the group consisting of a bond, $C_1–C_{10}$ alkyl, and $—R_8—D_1—R_8—$ wherein $D_1$, $R_5$, $R6$, a, b, and $R_8$ are as defined above (except $R_8$ is not $—OR_5O—$).

Preferably, the compounds of Formula VII comprise:

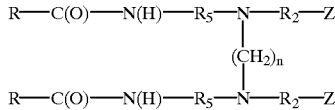
VIII.

wherein R, $R_2$, $R_5$ and Z are as defined above and n equals a number from about 2 to about 10. More particularly, the compounds of Formula VII comprise:

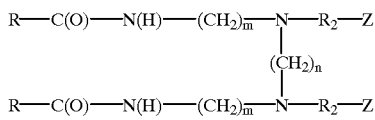
IX.

wherein R, $R_2$, $R_5$, Z, and n are as defined hereinbefore; and m independently equals a number between about 2 and about 10.

Representative compounds of Formula VII include:

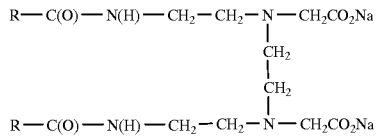
X.

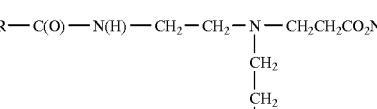
XI.

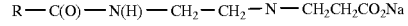

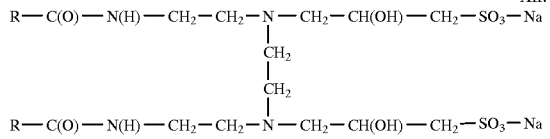
XII.

While the compounds of Formulae VII–XII can be prepared by a variety of synthetic routes, it has been found that they can be produced particularly effectively by a process which utilizes a polyamine reactant having at least four amino groups of which two are terminal primary amines such as triethylene tetramine. These processes are more fully set forth in copending application "Amphoteric Surfactants Having Multiple Hydrophobic and Hydrophilic Groups", U.S. Ser. No. 08/292,993 filed 08/19/94, now U.S. Pat. No. 5,656,586, the entire disclosure of which is incorporated herein by reference.

Another group of gemini surfactants which have been found to provide the low concentration emulsions of this invention are the cyclic cationic quaternary surfactants of the formula:

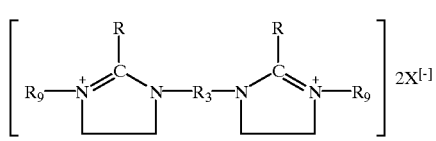
XIII.

wherein R and $R_3$ are as identified hereinbefore in formula VII; $R_9$ is independently a $C_1–C_{10}$ alkyl or alkylaryl; and X represents a counterion such as an anion illustrated by halogen (Cl, Br, and I), alkylsulfate such as methyl or ethylsulfate, alkylphosphate such as methylphosphate, and the like.

Preferably, the compounds used in the present invention comprise those of Formula XIII in which $R_3$ is a $C_2–C_4$ alkyl, most preferably ethyl, $R_9$ is a lower alkyl of from 1 to about 4 carbon atoms, most preferably methyl; and X is halogen or methylsulfate.

The compounds of Formula XIII can be prepared by a variety of snythetic routes though it has been found that they can be produced particularly effectively by quaternizing a bisimidazoline prepared by a process disclosed and claimed in copending application "Amphoteric Surfactants having Multiple Hydrophobic and Hydrophilic Groups", U.S. Ser. No. 08/292,993 filed Aug. 19, 1994, now U.S. Pat. No. 5,656,586, wherein a polyamine reactant having at least four amino groups, of which two are terminal primary amine groups, is reacted with an acylating agent such as a carboxylic acid, ester, and the naturally occurring triglyceride esters thereof or acid chlorides thereof in an amount sufficient to provide at least about 1.8 fatty acid groups $[R_1C(O)—]$ per polyamine to provide the bisimidazoline.

Also included in the gemini surfactants useful in this invention are those of the formula:

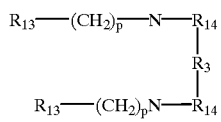
XIV.

wherein $R_{13}$ is a sugar moiety, e.g., a monosaccharide, desaccharide, or polysaccharide such as glucose; or a polyhydroxy compound such as glycerol; p is independently 0 to 4; $R_3$ is as defined above in formula VII; and $R_{14}$ is a $C_1–C_{22}$ alkyl or $—C(O)R_4$ wherein $R_4$ is as described above.

Some of the compounds such as those described above are set forth more fully in U.S. Pat. No. 5,534,197 which description is incorporated herein by reference.

In the compounds used in the invention, many of the moieties can be derived from natural sources which will generally contain mixtures of different saturated and unsaturated carbon chain lengths. The natural sources can be illustrated by coconut oil or similar natural oil sources such as palm kernel oil, palm oil, osya oil, rapeseed oil, castor oil or animal fat sources such as herring oil and beef tallow. Generally, the fatty acids from natural sources in the form of the fatty acid or the triglyceride oil can be a mixture of alkyl radicals containing from about 5 to about 22 carbon atoms. Illustrative of the natural fatty acids are caprylic ($C_8$), capric ($C_{10}$), lauric ($C_{12}$), myristic ($C_{14}$), palmitic ($C_{16}$), stearic ($C_{18}$), oleic ($C_{18}$, monounsaturated), linoleic ($C_{18}$, diunsaturated), linolenic ($C_{18}$, triunsaturated), ricinoleic ($C_{18}$, monounsaturated) arachidic ($C_{20}$), gadolic ($C_{20}$, monounsaturated), behenic ($C_{22}$) and erucic ($C_{22}$). These fatty acids can be used per se, as concentrated cuts or as fractionations of natural source acids. The fatty acids with even numbered carbon chain lengths are given as illustrative though the odd numbered fatty acids can also be used. In addition, single carboxylic acids,e.g., lauric acid, or other cuts, as suited for the particular application, may be used.

Where desired, the surfactants used in the present invention can be oxyalkylated by reacting the product with an alkylene oxide according to known methods, preferably in the presence of an alkaline catalyst. The free hydroxyl groups of the alkoxylated derivative can then be sulfated, phosphated or acylated using normal methods such as sulfation with sulfamic acid or sulfur trioxide-pyridine complex, or acylation with an acylating agent such as a carboxylic acid, ester, and the naturally occurring triglyceride esters thereof.

For alkylation conditions and commonly used alkylating agents, see Amphoteric Surfactants Vol. 12, Ed. B. R. Bluestein and C. L. Hilton, *Surfactant Science Series* 1982, pg. 17 and references cited therein, the disclosures of which are incorporated herein by reference.

For sulfation and phosphation, see Surfactant Science Series, Vol. 7, Part 1, S. Shore & D. Berger, page 135, the disclosure of which is incorporated herein by reference. For phosphating review, see Surfactant Science Series, Vol. 7, Part II, E. Jungermann & H. Silbertman, page 495, the disclosure of which is incorporated herein by reference.

The surfactant compositions of the invention are extremely effective in aqueous solution at low concentrations as defined herein. The surfactants of the invention can be used in any amount needed for a particular application which can be easily determined by a skilled artisan without undue experimentation.

III. Polymeric Soil Release Agents

Soil release agents, usually polymers, are especially desirable additives for releasing hydrophobic stains from textile fibers especially synthetics and also are used as effective particle suspending agents for liquid detergent, and fabric softener systems. Suitable soil release agents are disclosed in U.S. Pat. Nos.: 4,702,857, Gosselink; 4,713,194, Gos-selink; 4,711,730, Gosselink et al.; 4,877,896, Maldonado, et al.; 4,956,447, Gosselink, et al.; 4,873,003, O'Lenick et al.; 4,999,128, Sonenstein; and 4,749,596, Evans, and 5,236,615, Trinh et al. said patents being incorporated herein by reference. Typical soil release agents include nonionic or anionic polymers, or mixtures thereof.

Especially effective polymeric soil release agents are the block copolymers of polyalkylene terephthalate and polyoxyethylene terephthalate, and block copolymers of polyalkylene terephthalate and polyethylene glycol. The polyalkylene terephthalate blocks preferably comprise ethylene and/or propylene alkylene groups. Many of such soil release polymers are nonionic. More specifically, these polymers are comprised of repeating units of ethylene and/or propylene terephthalate and polyethylene oxide terephthalate, preferably at a molar ratio of ethylene terephthalate units to polyethylene oxide terephthalate units of from about 25:75 to about 35:65, said polyethylene oxide terephthalate containing polyethylene oxide blocks having molecular weights of from about 300 to about 2000. The molecular weight of these polymeric soil release agents is in the range of from about 4,000 to about 55,000. Other useful soil release polymers include, but are not limited to, sulfonated polyethylene terephthalate, polyester urethane, and acetic acid ethenyl esters; the polyethylene terephthalate/ polyoxyethylene terephthalate (PET-POET) polymer being most preferable. Typically, molecular weight ranges of these polymers are from 500 to 120,000, preferably, 2000 to 35,000, and most preferably 2000 to 25,000.

U.S. Pat. No. 4,976,879, Maldonado/Trinh/Gosselink, discloses specific preferred soil release agents which can also provide improved antistat benefit; said patent being incorporated herein by reference.

Another preferred polymeric soil release agent is a crystallizable polyester with repeat units of ethylene terephthalate containing from about 10% to about 15% by weight of ethylene terephthalate units together with from about 10% to about 50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the crystallizable polymeric compound is between 2:1 and 6:1. Examples of this polymer include the commercially available materials Zelcon 4780 (from DuPont) and Milease T (from ICI).

A more complete disclosure of these highly preferred soil release agents is contained in European Patent Application 185,427, Gosselink, published Jun. 25, 1986, incorporated herein by reference.

A preferred nonionic soil release polymer has the following average structure:

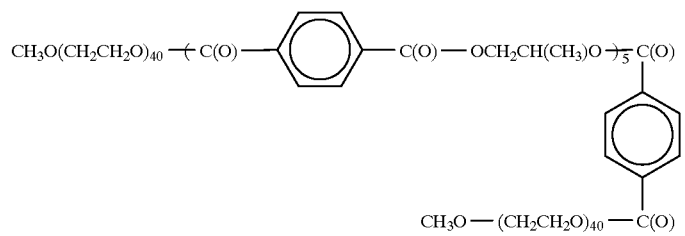

Such soil release polymers are described in U.S. Pat. No. 4,849,257, Borcher, et al., this patent being incorporated herein by reference.

Another preferred nonionic soil release polymer has the following average structure:

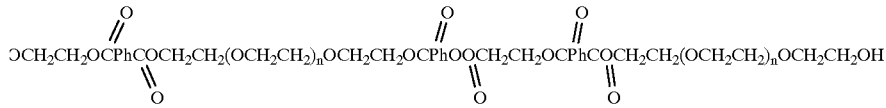

wherein n is preferably between about 50 to about 150.

Another preferred nonionic soil release polymer is described in now abandoned U.S. patent application Ser. No. 07/676,682, filed Mar. 28, 1991, by Pan, et al., for Nonionic Soil Release Agents; this application being incorporated herein by reference.

The most preferred nonionic soil release agents are the REPEL-O-TEX line of soil release agents sold by Rhône-Poulenc Inc., Cranbury, N.J. These products include REPEL-O-TEX SRP3, REPEL-O-TEX SRP4, REPEL-O-TEX QCJ product and REPEL-O-TEX QCX products. VELVETOL 251C is a 100% active hydrophilic polyester from which REPEL-O-TEX SRP3, SRP4, AND QCJ are manufactured at different polymer concentrations. The polymers have a molecular weight of from about 3,000 to about 10,000. REPEL-O-TEX QCJ product is a 15 weight percent active dispersion of the above mentioned polymer for liquid laundry detergents, whereas SRP3 and SRP4 are diluted with sodium sulfate for powder detergent applications. The polymers of the REPEL-O-TEX products are nonionic polyester-polyether (PET-POET) transesterification co-polymers. The REPEL-O-TEX QCX is a higher molecular weight hydrophilic polyester polymer with a molecular weight range of from about 10,000 to about 35,000.

Suitable anionic polymeric or oligomeric soil release agents are disclosed in U.S. Pat. Nos. 4,018,569, Trinh, and 4,787,989, Fanelli, et al.; these patents being incorporated herein by reference. Other suitable polymers are disclosed in U.S. Pat. Nos. 4,808,086, Evans et al.; this patent being incorporated herein by reference.

Cationic polymeric soil release agents are also useful in the present invention. Suitable cationic soil release polymers are described in U.S. Pat. No. 4,956,447, Gosselink, et al. and U.S. Pat. No. 4,873,003, O'Lenick, et al.; also, U.S. Pat. No. 5,405,542, Trinh et al. These patents also are incorporated by reference.

IV. Auxiliary Detergent Ingredients

A. Detergency Builders

Compositions of the present invention may include detergency builders selected from any of the conventional inorganic and organic water-soluble builder salts, including neutral or alkaline salts, as well as various water-insoluble and so-called "seeded" builders.

Builders are preferably selected from the various water-soluble, alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Most preferred are the alkali metal, especially sodium, salts of the above.

Specific examples of inorganic phosphate builders are sodium and potassium tripolyphosphate, pyrophosphate, polymeric metaphate having a degree of polymerization of from about 6 to 21, and orthophosphate. Examples of polyphosphonate builders are the sodium and potassium salts of ethylene-1, 1-diphosphonic acid, the sodium and potassium salts of ethane 1-hydroxy-1, 1-diphosphonic acid and the sodium and potassium salts of ethane, 1,1,2-triphosphonic acid.

Examples of nonphosphorus, inorganic builders are sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4.

Water-soluble, nonphosphorus organic builders useful herein include the various alkali metal, ammonium and substituted ammonium polyacetates, carboxylates, polycarboxylates and polyhydroxysulfonates. Examples of polyacetate and polycarboxylate builders are the sodium, potassium, lithium, ammonium and substituted ammonium salts of ethylenediamine tetraacetic acid, nitrilotriacetic acid, oxydisuccinic acid, mellitic acid, benzene polycarboxylic acids, and citric acid.

Highly preferred polycarboxylate builders herein are set forth in U.S. Pat. No. 3,308,067, Diehl, issued Mar. 7, 1967 incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Other builders include the carboxylated carbohydrates of U.S. Pat. No. 3,723,322, Diehl incorporated herein by reference.

Other useful builders herein are sodium and potassium carboxymethyloxymalonate, carboxymethyloxysuccinate, cis-cyclohexanehexacarboxylate, cis-cyclopentanetetracarboxylate phloroglucinol trisulfonate, water-soluble polyacrylates (having molecular weights of from about 2,000 to about 200,000 for example), and the copolymers of maleic anhydride with vinyl methyl ether or ethylene.

Other suitable polycarboxylates for use herein are the polyacetal carboxylates described in U.S. Pat. No. 4,144,226, issued Mar. 13, 1979 to Crutchfield et al.; and U.S. Pat. No. 4,246,495, issued Mar. 27, 1979 to Crutchfield et al., both incorporated herein by reference.

"Insoluble" builders include both seeded builders such as 3:1 weight mixtures of sodium carbonate and calcium carbonate; and 2.7:1 weight mixtures of sodium sesquicarbonate and calcium carbonate. Amphorus and crystalline alumino silicates such as hydrated sodium Zeolite A are commonly used in laundry detergent applications. They have a particle size diameter of 0.1 micron to about 10 microns depending on water content of these molecules. These are referred to as ion exchange materials. Crystalline alumino silicates are characterized by their calcium ion exchange capacity. Amphorus alumino silicates are usually characterized by their magnesium exchange capacity. They can be naturally occurring or synthetically derived.

A detailed listing of suitable detergency builders can be found in U.S. Pat. No. 3,936,537, supra, incorporated herein by reference.

B. Miscellaneous Detergent Ingredients

Detergent composition components may also include hydrotropes, enzymes (e.g., proteases, amylases and cellulases), enzyme stabilizing agents, pH adjusting agents (monoethanolamine, sodium carbonate, etc.) halogen bleaches (e.g., sodium and potassium dichloroisocyanurates), peroxyacid bleaches (e.g., diperoxydodecane-1,12-dioic acid), inorganic percompound bleaches (e.g., sodium perborate), antioxidants as optional stabilizers, reductive agents, activators for percompound bleaches (e.g., tetraacetylethylenediamine and sodium nonanoyloxybenzene sulfonate), soil suspending agents (e.g., sodium carboxymethyl cellulose), soil anti-redisposition agents, corrosion inhibitors, perfumes and dyes, buffers, whitening agents, solvents (e.g., glycols and aliphatic alcohols) and optical brighteners. Any of other commonly used auxiliary additives such as inorganic salts and common salt, humectants, solubilizing agents, UV absorbers, softeners, chelating agents, static control agents and viscosity modifiers may be added to the detergent compositions of the invention.

For bar compositions, processing aids are optionally used such as salts and/or low molecular weight alcohols such as monodihydric, dihydric (glycol, etc.), trihydric (glycerol, etc.), and polyhydric (polyols) alcohols. Bar compositions may also include insoluble particulate material components, referred to as "fillers" such as alcium carbonate, silica and the like.

V. Composition Concentrations

The total weight percentages of the conventional surfactants of the present invention, all weight percentages being based on the total active weight of the compositions of this invention consisting of conventional surfactant(s), gemini surfactant(s), soil release agent(s), and (optionally) detergency builder(s) are about 10 to about 99.9 weight percent, preferably about 15–75 weight percent.

The gemini surfactants are suitably present at a level of about 0.005 to about 50, preferably from about 0.02–15.0, active weight percent of the composition.

The polymeric soil release agents, are suitably employed at a level of from about 0.05 to about 40, preferably from about 0.2–15 active weight percent.

The optional detergency builders are suitably present at a level of from about 0 to about 70 weight percent, preferably from about 5 to about 50 weight percent.

VI. Detergent and/or Fabric Softener Compositions

In the preparation of detergent and/or fabric softening compositions, other optional ingredients such as bleaches, enzymes, antioxidants, reductive agents, perfumes, fabric brighteners and the like may be included in amounts each of from about 0 to about 5 weight percent based on the active weight of the composition.

Specific to fabric softener compositions, they generally comprise from about 10 to 80 active weight percent cationic conventional surfactant; about 0.005 to about 20, preferably 0.02–10 active weight percent gemini surfactant. The gemini surfactant may be cationic, nonionic, amphoteric or mixtures thereof. They also contain about 0.1 to about 5, preferably about 0.2–3.0, most preferably about 0.2 to about 1.5 weight percent of polymeric soil release agent. Gemini/polymer synergy enhances soil release and general detergency boosting benefits, and improves suspending/stabilizing properties of the polymeric suspending agents.

Other optional ingredients for liquid detergents include liquid carriers and adjuvants as disclosed by U.S. Pat. No. 5,402,542, Trinh et al., incorporated herein by reference in its entirety.

The liquid carrier is preferably selected from the group consisting of water and mixtures of the water and short chain $C_1$–$C_4$ monohydric alcohols. The water used can be distilled, deionized, or tap water. Mixtures of water and up to about 15% of a short chain alcohol such as ethanol, propanol, isopropanol or butanol, and mixtures thereof, are useful as the carrier liquid.

Adjuvants can be added to the softener compositions for their known purposes. Such adjuvants include, but are not limited to, clays, viscosity control agents, perfumes, emulsifiers, preservatives, anti-foaming agents, antioxidants, bactericides, fungicides, brighteners, opacifiers, freeze-thaw control agents, shrinkage control agents, and agents to provide ease of ironing. These adjuvants, if used, are added at their usual levels, generally each of up to about 5% by active weight of the composition.

The fabric softener compositions can be prepared by conventional methods such as those disclosed in U.S. Pat. No. 5,405,542, Trinh et al.

The present invention is further illustrated by the following non-limiting examples.

EXAMPLES

To explore the benefits of employing gemini surfactants together with conventional surfactants and soil release polymers, the following examples were run. Tables in the present specification list the resulting data. In the examples, the TERG-O-TOMETER, which is a laboratory scale apparatus designed to simulate the washing process under controlled conditions, was used to evaluate soil release performance. It is manufactured by United Testing Company of Hoboken, N.J.

The soil release test procedure of these examples involved a prewash cycle (cloths repeatedly being washed before staining). Clean fabrics, two DACRON single knit (DSK), two DACRON double knit (DDK) and two DACRON/cotton blend (D65/C35) from Scientific Services, or two pieces of cotton fabric, were prewashed for 12 minutes at 120° F., with 150 ppm (2/1 Ca++/Mg++) water hardness and cold water rinse.

After drying for 45 minutes on a "high" dryer setting, swatches were stained with three drops of dirty motor oil (local mechanic shop). Swatches were allowed to wick overnight. The stained swatches were washed once under the same prewash conditions. The same formulas used in the prewash were used in the final wash.

Evaluation was performed by making the following measurements:

$Rd_1$=Average reflectance of prewashed fabric $Rd_2$=Average reflectance of wicked cloth $Rd_3$=Average reflectance of cleaned cloth Then % soil removed scores listed on the Tables for the examples was calculated as follows:

% soil removal=$((Rd_3-Rd_2)/(Rd_1-Rd_2))\times 100\%$.

It is noted that in all the examples, all like ingredient abbreviations or designations indicate like ingredients.

Examples 1–7 and Comparative Examples 1–3

Compositions of the present invention were tested for effectiveness by measuring reflectance. A higher reflectance number means a cleaner fabric. According to the above test procedure, samples of the fabric were each washed five (5) times at 120° F. for 12 minutes. Detergent concentration was used at 1 gm. per liter which is usually the recommended commercial use level. Dirty motor oil was then added to the fabric and the fabric was allowed to wick overnight. Afterwards, the oily fabric was washed once in a washing solution having the same composition used previously (in the prewash) and the fabric's reflectance was measured using Spectrogard equipment, common in the industry and available from BYK-Gardner.

In these Examples 1–7 and Comparative Examples 1–3, the base detergent is an anionic detergent having an all anionic surfactant package except for Neodol 25–9 (1.3%). The composition is listed in TABLE 1. These examples and comparative examples all employ 1 active weight percent REPEL-O-TEX SRP3 polymeric soil release polymer. This SRP is composed of 50% VELVETOL 251C (polymer having a molecular weight range of 3,000–10,000) and 50% sodium sulfate.

TABLE 1

| Ingredient of Anionic Base Detergent A | Weight % |
| --- | --- |
| LAS[1] | 6.0% |
| PS-603[2] | 6.6 |
| NEODOL 25-9[3] | 1.3 |
| Na-Sulfate[4] | 8.3 |
| LSB[5] | 8.1 |
| Na-Carbonate[9] | 30.0 |
| Silicate[7] | 1.2 |
| Zeolite[8] | 29.3 |
| Perborate[9] | 0.6 |
| Water[10] | 2.3 |
| Additives[11] | QS |

Notes:
[1]Linear alkyl benzene sulfonate
[2]Linear ether sulfate-12–15 C's chain, 3EO
[3]Linear alcohol ethoxylate, 12–15 C's
[4]Sodium sulfate
[5]Sodium lauryl sulfate
[6]Sodium carbonate
[7]Sodium silicate
[8]Builder Zeolite A
[9]Bleach
[10]Deionized
[11]Additives These examples also employ, as the nonionic gemini surfactant, methylene bisoctyl-phenol ethoxylate (MBOP) having an average chain of 6.5 ethylene oxide groups for each of the two moieties of the gemini surfactant. Moreover, for any examples of the present disclosure, whenever the number of ethylene oxide units for MBOP is not indicated in the TABLES, the MBOP has 13 unit ethylene oxide chains. The amount of the gemini surfactant is listed in TABLE 2 as active weight percent.

The formula of this ethoxylated MBOP is as follows:

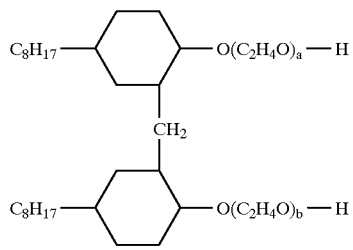

Moreover, in TABLE 3, C/P means cotton polyester, DSK means DACRON polyester single knit and DDK means DACRON polyester double knit.

TABLE 2

Soil Release Removal

| | | Fabric Tested | | |
| --- | --- | --- | --- | --- |
| Example No. | Ingredients | C/P | DSK | DDK |
| Comparative 1 | Base A + 1% SRP3 | 18.3 | 13.7 | 4.1 |
| 1 | Base A + 0.5% MBOP + 1% SRP3 | 34.6 | 7.7 | 10 |
| 2 | Base A + 1% MBOP + 1% SRP3 | 35.7 | 90.5 | 53.1 |
| 3 | Base A + 1.5% MBOP + 1% SRP3 | 34.8 | 90.5 | 74.4 |
| Comparative 2 | Base A + 1% SRP3 | 11.7 | 7.2 | 7.4 |
| Comparative 3 | Base A + 1% SRP3 | 11.5 | 6.1 | 6.4 |
| 4 | Base A + 3% MBOP + 1% SRP3 | 28.9 | 91.3 | 68.7 |
| 5 | Base A + 3% MBOP + 1% SRP3 | 29.3 | 93.2 | 67.2 |
| 6 | Base A + 5% MBOP + 1% SRP3 | 24.2 | 90.5 | 64.5 |
| 7 | Base A + 5% MBOP + 1% SRP3 | 24 | 91 | 64.2 |

Comparison of the data in Comparative Examples 1–3 with that of Examples 1–7 shows an increase in Reflectance from as little as 0.5% MBOP on cotton polyester fabric. However, reflectance dramatically increases for the DACRON fabrics when 1.0% MBOP was employed. This implies that a somewhat lower level of MBOP e.g., 0.75% would be highly effective with REPEL-O-TEX SRP3.

Examples 8–11 and Comparative Examples 4–5

Examples 8–11 and Comparative Examples 4–5 repeat the procedure of the above examples to explore the effects of employing MBOP with SOKALAN HP-22, a soil release polymer made by BASF, Inc., and to compare SOKOLAN HP-22 with REPEL-O-TEX soil release polymer. The examples also explore the effect of changing the degree of ethoxylation of MBOP. The base detergent is Base Detergent A is in the above examples, and thus, contains anionic surfactant. The compositions further contain SOKOLAN HP-22, SRP3 (REPEL-O-TEX) and/or ethoxylated MBOP as listed in TABLE 3. TABLE 3 also shows the number of ethylene oxide groups in the chains of MBOP for Examples 8–11.

In TABLE 3, MBOP-13 is methylene bis octylphenol-13EO, MBOP-5 is methylene bisoctylphenol-5EO, and MBOP-20 is methylene bis octylphenol-20EO.

TABLE 3

Soil Release Removal

| | | Fabric Tested | | |
| --- | --- | --- | --- | --- |
| Example No. | Ingredients | C/P | DSK | DDK |
| Comparative 4 | Base A + 1% HP-22 | 4.5 | 3.0 | 2.9 |
| 8 | Base A + 1% HP-22/1.5% MBOP - 13 | 13.5 | 8.9 | 5.0 |
| Comparative 5 | Base A + 1.0% MBOP/no SRP | 7.3 | 2.7 | 3.2 |
| 9 | Base A + 0.75% MBOP - 13 + 1% SRP | 37.2 | 41.4 | 10.5 |
| 10 | Base A + 1.0% MBOP - 5 + 1% SRP | 37.8 | 53.2 | 20.8 |
| 11 | Base A + 1.0% MBOP - 20 + 1% SRP | 40.1 | 92.5 | 24.0 |

The data of TABLE 3 shows the performance improvement with Sokalan HP-22 is not as dramatic as for use of REPEL-O-TEX soil release polymer with ethoxylated MBOP. Moreover, comparison of Examples 10 and 11 shows that increasing the length of the ethylene oxide chains improves performance.

Examples 12–15 and Comparative Example 6

Examples 12–15 repeat the procedure of the above examples to study the effect of changing from REPEL-O-

TEX soil release polymer to PF soil release polymer and employing an anionic gemini surfactant, a sulfated MBOP surfactant; and the effect of changing from REPEL-O-TEX SRP3 soil release polymer to the QCX soil release polymer. REPEL-O-TEX QCX polymer is a heavier number average molecular weight as mentioned previously in this specification. Except as indicated, these examples employed the same anionic surfactant-containing Base Detergent A as did the above examples.

TABLE 4

Soil Release Removal

| | | Fabric Tested | | | |
|---|---|---|---|---|---|
| Example No. | Ingredients | C/P | DSK | DDK | Cotton |
| 12 | Base A + 1% SRP3 + 1% MBOP | 60.9 | 94.6 | | 70.5 |
| 13 | Base A + 1% PF + 2% Anionic Gemini | 14.5 | 12.2 | 3.2 | |
| Comparative 6 | Base A + 1% QCX | 40.7 | 35.8 | 21.7 | |
| 14 | Base A + 1% QCX + 1% MBOP | 53.8 | 91.4 | 34.0 | |
| 15 | Base A + 1% QCX + 0.5% MBOP | 54.5 | 91.2 | 71.5 | |

The data of TABLE 4 shows that in Example 12, the composition of the present invention is excellent at removing oil from cotton. Comparative Example 6 and Examples 14 and 15 show that MBOP dramatically increases the effectiveness of REPEL-O-TEX QCX soil release polymer. Comparison of Examples 1 (TABLE 2) and 15 shows that lower concentrations (0.5%) of MBOP are more effective with the REPEL-O-TEX QCX soil release polymer as compared with the lower molecular weight REPEL-O-TEX SRP3 soil release polymer.

Examples 16–18 and Comparative Examples 7–15

Examples 16–18 and Comparative Examples 7–15 test the effects of employing an amphoteric surfactant-containing base detergent of TABLE 5, nonionic surfactant-containing base detergent, and cationic surfactant-containing base detergent.

TABLE 5

| Ingredient | Weight % |
|---|---|
| C2M-NP[12] | 21 |
| Na-Sulfate[4] | 8.3 |
| Na-Carbonate[9] | 30.0 |
| Silicate[7] | 1.2 |
| Zeolite[8] | 29.3 |
| Perborate[9] | 0.6 |
| Water[10] | 2.3 |
| Additives[11] | QS |
| NEDOL 25-9[3] | 1.3 |

Notes:
See TABLE 1
[12]sodium monoamphodiacetate, sold by Rhone-Poulenc Inc., Cranbury New Jersey under the Miranol $C_2$M-NP Trademark.

The nonionic surfactant-containing base detergent has the same composition as listed in TABLE 5, except that CO-630 nonionic surfactant, nonyl phenol ethoxylate, available from Rhone-Poulenc Inc. is employed instead of C2M-NP amphoteric surfactant. The cationic surfactant-containing base detergent is also the same as that of TABLE 5, except that it employs RHODAQUAT T90 cationic surfactant, ditallow imidazoline methyl sulfate, also available from Rhône-Poulenc Inc., Cranbury, N.J.

The resulting data for these examples is shown in TABLE 6.

TABLE 6

Soil Release Removal

| | | Fabric Tested | | |
|---|---|---|---|---|
| Example No. | Ingredients | C/P | DSK | DDK |
| Comparative 7 | Nonionic Base + 1% SRP3 | 47.5 | 98.3 | 55.1 |
| Comparative 8 | Nonionic Base + 3% MBOP | 21.7 | 3.6 | 1.5 |
| 16 | Nonionic Base + 3% MBOP + 1% SRP3 | 60.0 | 97.5 | 76.0 |
| Comparative 9 | Cationic Base + 1% SRP3 | 1.7 | 5.1 | 4.4 |
| Comparative 10 | Cationic Base + 3% MBOP | 4.6 | 3.2 | 2.3 |
| 17 | Cationic Base + 1% SRP3 + 3% MBOP | 5.5 | 79.1 | 37.4 |
| Comparative 11 | Amphoteric Base | 0.0 | 2.5 | 2.5 |
| Comparative 12 | Amphoteric Base 1% SRP3 | 20.0 | 92.8 | 8.0 |
| Comparative 13 | Amphoteric Base + 3% MBOP | 9.9 | 3.3 | 3.7 |
| 18 | Amphoteric Base + 1% SRP3 + 3% MBOP | 32.7 | 35.3 | 17.4 |
| Comparative 14 | Nonionic Base | 3.8 | 0.9 | 1.0 |
| Comparative 15 | Cationic Base | 0.9 | 0.00 | 21.5 |

Table 6 shows an enhanced synergy in nonionic based detergent systems when incorporating MBOP and SRP3 in Example 16 as opposed to Comparative 8. Example 16 shows better enhancement in C/P and DDK than Comparative 7.

TABLE 6 shows the use of REPEL-O-TEX SRP3 soil release polymer with ethoxylated MBOP gemini surfactant in a cationic conventional surfactant system. Example 17 was far superior to the compositions with either the gemini surfactant or SRP3 alone in Comparative Examples 9 and 10 or cationic base alone in Comparative Example 15. This has tremendous implications for improved fabric softener's ability to provide soil release removal and detergency enhancement. Typically, cationic surfactants are employed as fabric softeners; which are not well known for good detergency. In contrast, the present invention can make cationic fabric softeners perform with high detergency and oily soil removal.

Comparison of Example 18 and Comparative Example 11 shows that the ethoxylated MBOP and SRP3 synergy improves soil release for all fabric types. Even more improvement can be realized by optimizing the ratio of polymer to MBOP used.

Examples 19–22 and Comparative Examples 16–19

Examples 19–22 and Comparative Examples 16–19 show that the present invention works in highly anionic systems other than the anionic Base A disclosed above. The tested systems are SUNLIGHT (Canada) detergent, a commercial detergent product sold by Lever Canada; anionic Base Detergent B, made with DDBSA; and anionic Base Detergent C, made with ether sulfate. The composition of anionic Base Detergent B is shown in TABLE 7. The composition of anionic base detergent C is shown in TABLE 8.

TABLE 7

Composition of Anionic Base Detergent B

| Ingredients | Weight % |
| --- | --- |
| Na Sulfate[4] | 16.22 |
| Na Carbonate[6] | 28 |
| Na Metasilicate[4] | 12.0 |
| STTP[13] | 32 |
| DDBSA[14] | 10 |
| Water[10] | 0.38 |

Notes:
See TABLE 1
[13]Sodium Tripolyphosphate
[14]Dodecylbenzenesulfonate, sodium salt - commercially available from Pilot under Calsoft trademark.

TABLE 8

Composition of Anionic Base Detergent C

| Ingredients | Weight % |
| --- | --- |
| Na Sulfate[4] | 16.22 |
| Na Carbonate[6] | 28 |
| Na Metasiliate[4] | 12.0 |
| STTP[13] | 32 |
| Rhodapex PS-603[15] | 10 |
| Water[10] | 0.38 |

Notes:
See TABLES 1 and 7.
[15]$C_{12}$–$C_{15}$ ether sulfate, 3 moles of ethoxylate, sodium salt - - - available from Rhone-Poulenc Inc.

The results of these examples are shown in TABLE 9.

TABLE 9

Soil Release Removal

| | | Fabric Tested | | | |
| --- | --- | --- | --- | --- | --- |
| Example No. | Ingredients | C/P | DSK | DDK | Cotton |
| 19 | Sunlight Canada + 1% SRP3 + 1% MBOP 13 | 48.6 | 92.9 | 51.7 | — |
| Comparative 16 | Sunlight Canada + 1% SRP3 | 57 | 10.0 | 11.0 | — |
| Comparative 17 | Base A | 1.2 | 1.5 | — | 59.9 |
| Comparative 18 | Base A + 1% MBOP | 21.7 | 6.5 | — | 63.1 |
| Comparative 19 | Base A + 1% SRP3 | 16.1 | 22.4 | — | 56.1 |
| 20 | Base A + 1% SRP3 + 1% MBOP | 53.8 | 97.1 | — | 69.4 |
| 21 | Base B + 1% SRP3 + 1% MBOP | 54.8 | 79.6 | — | 69.4 |
| 22 | Base C + 1% SRP3 + 1% MBOP | 57.6 | 95.2 | — | 69.3 |

Example 19 indicates that the use of REPEL-O-TEX SRP3 soil release polymer with ethoxylated MBOP improves performance of SUNLIGHT (Canada) commercial detergent for DACRON polyester fabric. Examples 21 and 22 show the anionic Base Detergent B and anionic Base Detergent C also benefits from combined use of REPEL-O-TEX soil release polymer with MBOP. Comparative Examples 17–19 and example 20 confirm that combined use of REPEL-O-TEX SRP3 soil release polymer with MBOP is favorable for cleaning cotton fabric as well as C/P and DACRON fabrics.

Examples 23–34

Table 10 shows further optimization of SRP3 and MBOP uses in Base A detergent following an experimental design approach for soil removal performance. Levels of REPEL-O-TEX QCX and MBOP gemini are the variables and C/P, DSK, and DDK cleaning are the responses in the experimental design matrix.

TABLE 10

With MBOP-13 and QCX; 5 Prewash @ 120 F.

| Example No. | % Detergent | C/P | DSK | DDK |
| --- | --- | --- | --- | --- |
| 23 | Base A + 0.25 QCX + 0.10 MBOP13 | 2.0 | 7.6 | 5.9 |
| 24 | Base A + 1.00/0.10 | 14.0 | 12.5 | 16.3 |
| 25 | Base A + 0.25/0.50 | 17.4 | 20.0 | 28.5 |
| 26 | Base A + 1.00/0.50 | 54.1 | 94.0 | 75.6 |
| 27 | Base A + 0.25/0.30 | 22.7 | 32.5 | 27.5 |
| 28 | Base A + 1.00/0.30 | 47.8 | 82.3 | 59.2 |
| 29 | Base A + .0.63/0.10 | 3.5 | 6.1 | 5.7 |
| 30 | Base A + 0.63/0.50 | 50.0 | 91.3 | 69.5 |
| 31 | Base A + 0.63/0.30 | 38.9 | 80.2 | 55.4 |
| 32 | Base A + 0.63/0.30 | 37.5 | 80.3 | 57.4 |
| 33 | Base A + 0.63/0.30 | 38.1 | 80.1 | 51.1 |
| 34 | Base A + 0.63/0.30 | 38.7 | 82.1 | 49.2 |

The level of use seems to be optimized around 0.63% polymer and 0.3% gemini surfactant for effective soil release performance for Base A detergent.

Although the subject matter has described with respect to the preferred embodiments, it will be readily apparent to those having ordinary skill in the art to which the invention pertains that changes and modifications may be made thereto without departing from the spirit or scope of the present invention as defined by the appended claims.

What is claimed is:

1. A composition comprising:
   a conventional surfactant having one hydrophobic group and one hydrophilic group per molecule;
   a nonionic gemini surfactant having two surfactant moieties connected to each other by a spacer moiety, each of the surfactant moieties comprising at least one hydrophobic group and at least one hydrophilic group; and
   a polymeric soil release agent.

2. The composition of claim 1, wherein the conventional surfactant is selected from the group consisting of nonionic, anionic, cationic, amphoteric surfactants and mixtures thereof.

3. The composition of claim 2, wherein the conventional surfactant comprises an anionic surfactant.

4. The composition of claim 3, wherein the anionic conventional surfactant is selected from the group consisting of a fatty acid soap, an ether carboxylic acid and salt thereof, an alkane sulfonate salt, an alpha-olefin sulfonate salt, a sulfonate salt of a higher fatty acid ester, a higher alcohol sulfate ester salt, fatty alcohol ether sulfate salts, an alkaryl sulfate, sulfonate or salt thereof, a higher alcohol phosphate ester salt, and a fatty alcohol ether phosphate ester salt, an alkyl glycerol sulfonate, sulfate or salt thereof, and a condensate of higher fatty acids.

5. The composition of claim 2, wherein the conventional surfactant is a cationic surfactant.

6. The composition of claim 5 wherein the cationic conventional surfactant is the reaction product of higher fatty acids with a polyamine selected from the group consisting of hydroxyalkylalkylenediamine, dialkylenetriamine, and mixtures thereof.

7. The composition of claim 5 wherein the cationic conventional surfactant is selected from the group consisting of an alkyltrimethylammonium salt, a dialkyldimethylammonium salt, an alkyldimethylbenzylammonium salt, an alkylpyridinium salt, an alkylisoquinolinium salt, benzethonium chloride, and an acylamino acid type cationic surfactant.

8. The composition of claim 2 wherein the conventional surfactant is an amphoteric surfactant.

9. The composition of claim 8, wherein the amphoteric conventional surfactant is selected from the group consisting of an amino acid, betaine, sultaine, phosphobetaine, an imidazoline amphoteric surfactant, soybean phospholipid, and yolk lecithin.

10. The composition of claim 8 wherein the amphoteric conventional surfactant is selected from the group consisting of alkali salts of alkyl amphocarboxyglycinates, alkyl amphocarboxypropionates, alkyl amphodipropionates, alkyl amphodiacetates, alkyl amphoglycinates, alkyl amphopropyl sulfonates and alkyl amphopropionates wherein alkyl represents an alkyl group having 6 to 20 carbon atoms.

11. The composition of claim 2, wherein the conventional surfactant comprises a nonionic surfactant.

12. The composition of claim 11 wherein the nonionic conventional surfactant is selected from the group consisting of:

polyethylene oxide condensates of alkyl phenols;

condensation products of aliphatic alcohols with from about 1 to about 25 moles of ethylene oxide;

condensation products of ethylene oxide with a hydrophobic base formed by the condensation of propylene oxide with propylene glycol;

condensation products of ethylene oxide with the reaction products of propylene oxide with ethylenediamine;

water soluble amine oxides, phosphine oxides or sulfoxides each having one alkyl moiety of from about 10 to 18 carbon atoms and two moieties selected from the group consisting of alkyl groups and hydroxy alkyl groups containing from about 1 to 3 carbon atoms; and mixtures thereof.

13. The composition of claim 11, wherein the nonionic conventional surfactant is selected from the group consisting of a fatty acid glycerine ester, a sorbitan fatty acid ester, a sucrose fatty acid ester, a polyglycerine fatty acid ester, a higher alcohol ethylene oxide adduct, a single long chain polyoxyethylene alkyl ether, a polyoxyethylene alkyl allyl ether, a polyoxyethylene lanolin alcohol, a polyoxyethylene fatty acid ester, a polyoxyethylene glycerine fatty acid, a polyoxyethylene propylene glycol fatty acid ester, a polyoxyethylene sorbitol fatty acid ester, a polyoxyethylene castor oil or hardened castor oil derivative, a polyoxyethylene lanolin derivative, a polyoxyethylene fatty acid amide, a polyoxyethylene alkyl amine, an alkyl pyrrolidone, glucamides, alkylpolyglucosides, a mono or dialkanol amide, a polyoxyethylene alcohol mono or diamide, and an alkylamine oxide.

14. The composition of claim 1 wherein the gemini surfactant comprises a compound of the formula:

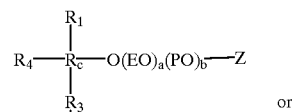
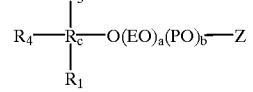

or

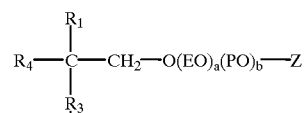
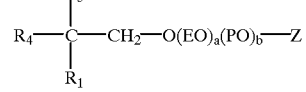

15. The composition of claim 1 wherein the polymeric soil release is selected from the group consisting of:
  i) block copolymers of polyalkylene terephthalate and polyoxyethylene terephthalate;
  ii) block copolymers of polyalkylene terephthalate and polyethylene glycol;
  iii) sulfonated polyethylene terephthalate;
  iv) polyester polyurethane; and
  v) acetic acid ethenyl esters.

16. The composition of claim 11 wherein the polymeric soil release agent is a polyethylene terephthalate-polyoxy ethylene terephthalate co-polymer.

17. The composition of claim 1 wherein the composition comprises:
  i) from about 10 to about 99.9 weight percent of the conventional surfactant;
  ii) from about 0.005 to about 50 weight percent of the gemini surfactant; and
  iii) from about 0.05 to about 50 weight percent of the soil release agent;
  all weight percents based on the active total weight of the conventional surfactant, gemini surfactant and soil release agent in said composition.

18. The composition of claim 1 wherein the composition comprises:
  i) from about 15 to about 75 weight percent of the conventional surfactant;
  ii) from about 0.02 to about 15 weight percent of the gemini surfactant; and
  iii) from about 0.2 to about 15 weight percent of the soil release agent;
  all weight percents based on the active total weight of the conventional surfactant, gemini surfactant and soil release agent in said composition.

19. A composition comprising:
a conventional surfactant having one hydrophobic group and one hydrophilic group per molecule;
methylene bisoctylphenol ethyoxylate; and
a polymeric soil release agent.

* * * * *

UNITED STATES PATENT AND TRADEMARK OFFICE
CERTIFICATE OF CORRECTION

PATENT NO.   : 5,922,663
DATED        : July 13, 1999
INVENTOR(S)  : Gabriel et al.

It is certified that error appears in the above-identified patent and that said Letters Patent is hereby corrected as shown below:

After the last line of claim 14, insert:

-- wherein; $R_c$ is aryl;

$R_1$; is independently hydrogen or $C_1$ to $C_{22}$ alkyl;
$R_c$ is aryl;
$R_3$ is selected from the group consisting of a bond, aryl, $C_1$-$C_{10}$ alkyl, -O-, -S-, -S-S-, -$NR_6$-, -$R_5$O-, $R_5(O(EO)_a(PO)_b)$-, -$D_1$-$R_8$-$D_1$-, and -$R_8$-$D_1$-$R_8$- wherein $R_8$ is independently $C_1$-$C_{10}$ alkyl, -C(O)-, -$R_5(O(EO)_a(PO)_b)$-, -O-$R_5$-O-, or aryl; and $D_1$ is independently -O-, -S-, -S-S-, -$SO_2$-, -C(O)-, -$O(EO)_a(PO)_b$-, -C(O)$NR_6$-, -$NR_6$-, -O-$R_5$-O-, or aryl wherein $R_5$ is $C_1$-$C_{12}$ alkyl, $R_6$ is hydrogen or $C_1$-$C_6$ alkyl,
$R_4$ is $C_1$ to $C_{22}$ alkyl,
Z is hydrogen; and
a and b each are from 0 to 100 and a plus b is at least 1. --

Signed and Sealed this

Ninth Day of October, 2001

*Attest:*

*Attesting Officer*

NICHOLAS P. GODICI
*Acting Director of the United States Patent and Trademark Office*